US009695055B2

(12) United States Patent
Yoon et al.

(10) Patent No.: US 9,695,055 B2
(45) Date of Patent: Jul. 4, 2017

(54) SYNTHETIC GEL FOR CRYSTAL GROWTH INDUCING ONLY SECONDARY GROWTH FROM SURFACE OF SILICALITE-1 OR ZEOLITE BETA SEED CRYSTAL

(75) Inventors: Kyung Byung Yoon, Seoul (KR); Cao Thanh Tung Pham, Seoul (KR); Hyun Sung Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 11 days.

(21) Appl. No.: 14/408,144

(22) PCT Filed: Jun. 15, 2012

(86) PCT No.: PCT/KR2012/004726
§ 371 (c)(1),
(2), (4) Date: Feb. 3, 2015

(87) PCT Pub. No.: WO2013/187542
PCT Pub. Date: Dec. 19, 2013

(65) Prior Publication Data
US 2015/0147268 A1 May 28, 2015

(51) Int. Cl.
*C01B 39/48* (2006.01)
(52) U.S. Cl.
CPC .................................. *C01B 39/48* (2013.01)
(58) Field of Classification Search
CPC ........................................................ C01B 39/48
See application file for complete search history.

(56) References Cited

U.S. PATENT DOCUMENTS

| 7,357,836 | B2 | 4/2008 | Tsapatsis et al. |
| 8,153,099 | B2 | 4/2012 | Yoon et al. |
| 9,290,859 | B2 | 3/2016 | Yoon et al. |
| 2005/0014371 | A1* | 1/2005 | Tsapatsis ........... B01D 67/0051 438/689 |

(Continued)

FOREIGN PATENT DOCUMENTS

| JP | 2009280481 | 12/2009 |
| KR | 20090120846 | 11/2009 |

(Continued)

OTHER PUBLICATIONS

International Search Report for PCT/KR2012/004726, English translation attached to original, Both completed by the Korean Patent Office on Feb. 1, 2013, 5 pages.

(Continued)

*Primary Examiner* — Melvin C Mayes
*Assistant Examiner* — Michael Forrest
(74) *Attorney, Agent, or Firm* — Brooks Kushman P.C.

(57) ABSTRACT

A synthetic gel for crystal growth, which induces only secondary growth from the surface of a silicalite-1 or zeolite beta seed crystal and cannot induce crystal nucleation in the synthetic gel for crystal growth or on the surface of the seed crystal. The synthetic gel contains fumed silica, tetraethylammonium hydroxide (TEAOH), $[(NH_4)_2SiF_6]$, KOH, and $H_2O$, or contains tetraethylorthosilicate (TEOS), tetraethylammonium hydroxide (TEAOH), hydrogen fluoride, and $H_2O$.

11 Claims, 26 Drawing Sheets

(56) References Cited

U.S. PATENT DOCUMENTS

| | | | |
|---|---|---|---|
| 2009/0291046 A1* | 11/2009 | Yoon | B01D 67/0051 423/707 |
| 2012/0114920 A1 | 5/2012 | Yoon et al. | |
| 2013/0216772 A1 | 8/2013 | Yoon et al. | |

FOREIGN PATENT DOCUMENTS

| | | |
|---|---|---|
| KR | 20120025806 | 3/2012 |
| WO | 2010117228 | 10/2010 |
| WO | 2010117229 | 10/2010 |
| WO | 2012033347 | 3/2012 |

OTHER PUBLICATIONS

Liu et al. Chem. Commun. 2012, vol. 48, p. 6782-6784, "Suppression of twins in b-oriented MFI molecular sieve films under microwave irradiation."

Kim et al. hem. Commun. 2012, vol. 48, p. 4659-4673, "A novel class of nonlinear optical materials based on host-guest composites: zoelites as inorganic crystalline hosts."

Lai et al. Advanced Functional Materials Jul. 2004, vol. 14, No. 7, p. 716-729 "Siliceous ZSM-5 Membranes by Secondary Growth of b-Oriented Seed Layers."

Liu et al. J. Am. Chem. Soc. 2010, vol. 132, p. 1768-1769, "Fabrication of Highly b-Oriented MFI Film with Molecular Sieving Properties by Controlled In-Plane Secondary Growth."

Kim et al. J.Am. Chem. Soc. 2004, vol. 126, p. 673-682, "Aligned Inclusion of Hemicyanine Dyes into Silica Zeolite Films for Second Harmonic Generation."

Japanese Office Action for Japanese Application No. 2015-517157, Completed by the Japanese Patent Office on Mar. 29, 2016, 7 Pages.

Chinese Office Action for Chinese Application No. CN 201280075317.0, English Translation attached to original, Dated Mar. 3, 2016, All together 17 Pages.

Larlus et al. Microporous and Mesoporous Materials 2006, vol. 93, pp. 55-61, "Synthesis of all-silica BEA-type material in basic media".

Mao-Ying et al. Acta Chimica Sinica 2002, vol. 60, No. 3, pp. 446-450, "Studies on Properties of Pure-silica B Zeolite".

Chen et al. Microporous and Mesoporous Materials 2009, col. 123, pp. 45-49, "Synthesis and characterization of pure-silica-zeolite Beta low-k thin films".

Cao et al. Science Dec. 16, 2011, vol. 334, pp. 1533-1538 "Growth of Uniformly Oriented Silica MFI and BEA Zeolite Films on Substrates".

* cited by examiner

SYNTHETIC GEL FOR CRYSTAL GROWTH INDUCING ONLY SECONDARY GROWTH FROM SURFACE OF SILICALITE-1 OR ZEOLITE BETA SEED CRYSTAL

CROSS-REFERENCE TO RELATED APPLICATION

This application is the U.S. national phase of PCT Application No. PCT/KR2012/004726 filed on Jun. 15, 2012, the disclosure of which is incorporated in it's entirety by reference herein.

TECHNICAL FIELD

The present invention relates to: a synthetic gel for crystal growth, which induces only secondary growth from the surface of silicalite-1 (SL) or zeolite beta (BEA) seed crystals and does not induce crystal nucleation in the synthetic gel or on the surface of the seed crystals; a silicalite-1 film or zeolite beta (BEA) film prepared by inducing secondary growth from silicalite-1 seed crystals or zeolite beta (BEA) seed crystals using the synthetic gel; a method of preparing a thin film or a thick film using the synthetic gel; and a film prepared by the method.

BACKGROUND ART

Zeolites are crystalline aluminosilicates having angstrom-scale pores and channels in their crystal lattice. Because sites around aluminum in the framework of aluminosilicate bear negative charges, cations for charge balancing are present in the pores, and the remaining space in the pores is usually filled with water molecules. The structure, shape and size of the three-dimensional pores in zeolites vary depending on the type of zeolite, but the diameter of the pores usually corresponds to the molecular size. Thus, a zeolite is also called "molecular sieve", because it has size selectivity or shape selectivity for molecules entering the pores depending on the type of zeolite.

Meanwhile, zeotype molecular sieves are known in which silicon (Si) and aluminum (Al) atoms constituting the framework structure of zeolite are partially or wholly replaced by various other elements. Examples of known zeotype molecular sieves include porous silicalite-based molecular sieves free of aluminum, $AlPO_4$-based molecular sieves in which silicon is replaced by phosphorus (P), and other zeotype molecular sieves obtained by substituting a portion of the framework of such zeolite and zeotype molecular sieves with various metal atoms such as Ti, Mn, Co, Fe and Zn. These zeotype molecular sieves are materials derived from zeolites, and do not belong to the zeolite group based on the mineralogical classification, but are commonly called zeolites in the art.

Accordingly, the term "zeolite" as used herein is meant to include the above-mentioned zeotype molecular sieves in a broad sense.

Meanwhile, a zeolite having an MFI structure is one of the most actively used zeolites and include the following types:
1) ZSM-5: MFI zeolite in which silicon and aluminum are present in a specific ratio;
2) Silicalite-1: zeolite composed only of silica; and
3) TS-1: MFI zeolite in which aluminum sites are partially replaced by titanium (Ti).

The structure of an MFI zeolite is shown in FIGS. 1A and 1B. In the MFI zeolite, approximately elliptical pores (0.51 nm×0.55 nm) are connected in a zigzag configuration to form channels extending in the a-axis direction, and approximately circular pores (0.54 nm×0.56 nm) linearly extend in the b-axis direction to form linear channels. No channels remain open in the c-axis direction.

Another zeolite, beta (BEA), adopts a truncated bipyramidal shape, with 6.6×6.7 Å channels running straight along the a- (or b-) axis and 5.6×5.6 Å channels running tortuously along the c-axis (FIG. 1C).

Powdery MFI zeolites are very widely used in household and industrial applications, including petroleum cracking catalysts, adsorbents, dehydrating agents, ion exchangers, gas purifiers, etc., meanwhile MFI zeolite thin films formed on porous substrates, such as porous alumina, are widely used as membranes for separating molecules through which molecules can be separated on the basis of size. Furthermore, MFI zeolite thin films can be used in a wide range of applications, including second- and third-order nonlinear optical thin films, three-dimensional memory materials, solar energy storage devices, electrode auxiliary materials, carriers of semiconductor quantum dots and quantum wires, molecular circuits, photosensitive devices, luminescent materials, low dielectric constant (k) thin films, anti-rusting coatings, etc.

As described above, the pore shape, size and channel structure of MFI zeolites vary depending on the crystal direction.

Meanwhile, methods for producing MFI zeolite thin films on substrates such as glass plates are broadly divided into a primary growth method and a secondary growth method. According to the primary growth method, a substrate is soaked in a gel for the synthesis of MFI zeolite without any pretreatment, and then spontaneous growth of an MFI zeolite film on the substrate is induced. The synthetic gel used herein usually contains tetrapropylammonium hydroxide (TPAOH). In this case, b-axis-oriented MFI zeolite crystals grow perpendicular to the glass substrate at the initial stage of the reaction. However, a-axis oriented crystals begin to grow subordinately from central portions of most of the crystals grown on the glass plate. In addition, with the passage of time, the crystals grow in various directions, and as a result, the final thin film has various orientations. The randomly-oriented MFI zeolite thin film is useful in some applications, but its applicability is limited. Particularly, when the randomly oriented MFI zeolite thin film is applied as a membrane for the separation of molecules, the molecular permeability, which is one of the most important factors in molecular separation, is markedly reduced. When organic bases other than TPAOH are used in the primary growth method, no MFI zeolite thin film grows on the substrate. To overcome such problems, the secondary growth method is used.

In the secondary growth method, a substrate having MFI zeolite crystals attached thereto is soaked in an MFI zeolite synthetic gel, and then allowed to react to form an MFI zeolite thin film. Herein, the MFI zeolite crystals attached to the substrate act as seed crystals. The orientation of the MFI zeolite crystals attached to the substrate plays a very important role in determining the orientation of the MFI zeolite thin film to be produced later. For example, when the a-axes of the MFI zeolite seed crystals are oriented normal to the substrate, the a-axes of the MFI zeolite thin film formed therefrom tend to be oriented normal to the substrate, and when the b-axes of the MFI zeolite seed crystals are oriented normal to the substrate, the b-axes of the MFI zeolite thin film formed therefrom tend to be oriented normal to the substrate.

However, the orientation of the resulting zeolite thin film is changed more sensitively to an organic base contained in the synthetic gel added to form the thin film, then to the orientation of the seed crystals. For example, the MFI synthetic gel which has been used in the secondary growth method usually contains TPAOH. In this case, even when all of the MFI zeolite seed crystals are attached to the substrate such that the a- or b-axes are oriented normal to the substrate, the orientation of the resulting MFI zeolite thin film changes randomly.

Throughout the specification, a number of publications and patent documents are referred to and cited. The disclosure of the cited publications and patent documents is incorporated herein by reference in its entirety to more clearly describe the state of the related art and the present disclosure.

DISCLOSURE

Technical Problem

Until now, there has been no report on a thin film with the a- (or b-) axes uniformly oriented normal to a substrate, even though there have been attempts to allow pure silica BEA (Si-BEA) to grow on substrates.

Therefore, it is an object of the present invention to provide a membrane preparation method capable of reproducibly preparing uniformly a-oriented SL (FIG. 1G) and b-oriented SL (FIG. 1H) and Si-BEA (FIG. 1I) membranes on substrates.

Technical Solution

In accordance with a first aspect of the present invention, there is provided a synthetic gel for crystal growth, which induces only secondary growth from a surface of silicalite-1 (SL) seed crystals and does not induce crystal nucleation in the synthetic gel or on the surface of the seed crystals, comprising fumed silica, tetraethylammonium hydroxide (TEAOH), [$(NH_4)_2SiF_6$], KOH and $H_2O$.

In accordance with a second aspect of the present invention, there is provided a silicalite-1 film prepared by inducing secondary growth from the surface of silicalite-1 (SL) seed crystals using the synthetic gel of the first aspect.

In accordance with a third aspect of the present invention, there is provided a synthetic gel for crystal growth, which induces only secondary growth from a surface of zeolite beta (BEA) seed crystals and does not induce crystal nucleation in the synthetic gel or on the surface of the seed crystals, comprising tetraethylorthosilicate (TEOS), tetraethylammonium hydroxide (TEAOH), hydrogen fluoride and $H_2O$.

In accordance with a fourth aspect of the present invention, there is provided a zeolite beta (BEA) film prepared by inducing secondary growth from the surface of zeolite beta (BEA) seed crystals using the synthetic gel of the third aspect.

In accordance with a fifth aspect of the present invention, there is provided a method for preparing a thin film or a thick film, the method comprising: (1) aligning non-spherical silicalite-1 or zeolite beta seed crystals on at least one surface of a substrate such that one or more or all of the a-axes, b-axes and c-axes of the seed crystals are oriented according to a predetermined rule; and (2) exposing the aligned seed crystals to the synthetic gel of the first aspect or the third aspect, and forming and growing the film from the seed crystals by a secondary growth method.

In accordance with a sixth aspect of the present invention, there is provided a film prepared by the above method.

Hereinafter, the present invention will be described in detail.

In the specification, the relationship between the a-, b- and c-axes of crystals is that the c-axis does not lie in a plane formed by the a-axis and the b-axis of crystals. For example, the a-, b- and c-axes of crystals may be perpendicular to one another, or the c-axis may be at an angle with respect to the plane formed by the a-axis and the b-axis of crystals.

In the present invention, a substrate coated with a silicalite-1 (SL) monolayer was immersed in a synthetic gel composed of water, tetraethylorthosilicate (TEOS), tetraethylammonium hydroxide (TEAOH) or bis-N,N-(tripropylammoniumhexamethylene) di-N,N-propylammoniumtrihydroxide (trimer-TPAOH), and then heated in a Teflon-lined autoclave at a desired temperature for an appropriate period of time. The use of TPAOH or trimer-TPAOH is essential for the syntheses of a SL film, because the $TPA^+$ ion (or $TPA^+$ analogs in trimer-TPAOH) acts as the structure-directing agent. As a result, these ions become entrapped at the intersections between the sinusoidal and straight channels, thereby blocking the channels, and they must be removed from the SL film by calcination (usually by heating at 550° C. for 12 hours under flowing oxygen or air) before the films can be used for separation and adsorption.

The crucial problem of the method is that the growth of a randomly oriented SL film on seed crystals occurs all the time, regardless of the seed crystal's orientations on a substrate or the thickness of the newly grown film. As a result, the sinusoidal channels running along the a axis and the straight channels running along the b-axis become randomly oriented within the film, with large degrees of channel discontinuity at various positions owing to large degrees of local crystal orientation mismatches. The randomly oriented film also has an intrinsically high propensity to crack during the calcination step owing to the complex thermal expansion coefficients of SL grains along each principal axis, which vary significantly not only in magnitude but also in sign in the temperature range between room temperature and the calcination temperature (Table 1).

TABLE 1

| Thermal expansion coefficients ($10^{-6°}$ C.$^{-1}$) | Temperature range | | |
|---|---|---|---|
| | 25-150° C. | 150-600° C. | 600-750° C. |
| $\alpha_a$ | −13.518 | −4.204 | −3.990 |
| $\alpha_b$ | +8.853 | −1.339 | −5.698 |
| $\alpha_c$ | +7.180 | −2.159 | −2.493 |
| $\alpha_V$ | +2.647 | −7.602 | −12.080 |

Table 1 above shows the thermal expansion coefficients of SL in a wide temperature range. SL crystals have complex temperature-dependent anisotropic thermal expansion coefficients, $\alpha_a$, $\alpha_b$, $\alpha_c$, and $\alpha_V$ where the subscripts a, b, c and V denote the principal axes and volume, respectively. Accordingly, each crystal undergoes anisotropic thermal expansion during the initial stage (25 to 150° C.) and anisotropic thermal contraction during the later stage of calcination (150 to 550° C.).

The present inventors prepared leaflet-shaped SL crystals (0.3×1.3×1.5 μm$^3$) (FIG. 5), rounded coffin-shaped SL crystals having four different sizes (0.35×0.12×0.7, 1.0×0.5×1.4, 1.5×0.6×1.9, and 2.8×1.1×4.8 μm$^3$) (FIG. 6), and truncated bipyramidal Si-BEA crystals (14×14×19 μm) (FIG. 7).

These were assembled into uniformly oriented monolayers on glass plates by rubbing (FIGS. 2A to 2C), and secondary growth was conducted on the surfaces. The key to successful growth of uniformly oriented films is to prepare gel compositions in appropriate condition and to find appropriate reaction temperatures.

After about 1000 trials, the present inventors could design a synthetic gel for crystal growth, which induces only secondary growth from the surface of silicalite-1 (SL) seed crystals and does not induce crystal nucleation in the synthetic gel or on the surface of the seed crystals.

The synthetic gel for crystal growth is characterized in that it contains fumed silica, tetraethylammonium hydroxide (TEAOH), [$(NH_4)_2SiF_6$], KOH and $H_2O$. Herein, the ratio of fumed silica:TEAOH:[$(NH_4)_2SiF_6$]:KOH:$H_2O$ is preferably 4.00:1.92:0.36:0.40:$n_1$ (molar ratio), where $n_1$ ranges from 30 to 80. The synthetic gel is in a powder state.

According to the present invention, a silicalite-1 film can be prepared by inducing secondary growth from the surface of silicalite-1 (SL) seed crystals using the synthetic gel.

The synthetic gel for crystal growth can induce secondary growth such that the a-axes of silicalite-1 (SL) are uniformly oriented (FIGS. 1D and 1G). Herein, secondary growth is preferably performed at 150° C.

Meanwhile, the synthetic gel for crystal growth may contain TEOS, TEAOH, $(NH_4)_2SiF_6$ and $H_2O$. Herein, the ratio of TEOS:TEAOH:$(NH_4)_2SiF_6$:$H_2O$ is preferably 4.00:1.92:0.36:$n_2$ (molar ratio), where $n_2$ ranges from 40 to 80. The synthetic gel is in a semi-solid state.

The synthetic gel for crystal growth can induce secondary growth such that the b-axes of silicalite-1 (SL) are uniformly oriented (FIGS. 1E and 1H). Accordingly, a silicalite-1 film can be prepared by inducing secondary growth from the surface of silicalite-1 (SL) seed crystals using the synthetic gel.

In addition, the present inventors designed a synthetic gel for crystal growth, which induces only secondary growth from the surface of zeolite beta (BEA) seed crystals and does not induce crystal nucleation in the synthetic gel or on the surface of the seed crystals.

The synthetic gel for crystal growth is characterized in that it contains tetraethylorthosilicate (TEOS), tetraethylammonium hydroxide (TEAOH), hydrogen fluoride and $H_2O$. The synthetic gel is in a semi-solid state.

Herein, the ratio of TEOS:TEAOH:hydrogen fluoride:$H_2O$ is preferably 4.00:2.20:2.20:$n_3$ (molar ratio), where $n_3$ ranges from 30 to 40.

According to the present invention, a zeolite beta (BEA) film can be prepared by inducing secondary growth from the surface of zeolite beta (BEA) seed crystals using the synthetic gel.

The synthetic gel for crystal growth can induce secondary growth such that the a-axes of zeolite beta (BEA) are uniformly oriented (FIGS. 1F and 1I).

In the synthetic gel, tetraethylammonium hydroxide (TEAOH) and tetraethylammonium hydroxide (TEAOH) serve as structure-directing agents.

As used herein, the term "structure-directing agent" refers to a material that acts as a template for a specific crystalline structure. The charge distribution, size and geometric shape of the structure-directing agent provide its structure-directing properties. The structure-directing agent used in the synthetic gel of the present invention is selected from among those that induce only secondary growth from the surface of seed crystals and that do not induce crystal nucleation in a solution for seed crystal growth or on the surface of seed crystals. The crystal growth rate along each crystal axis is not critical, as long as crystal nucleation is not inducted.

Seed crystals can also be formed using a seed structure-directing agent. Because the use of the seed structure-directing agent induces crystal nucleation, it is not preferred to use the seed structure-directing agent as a structure-directing agent for secondary growth.

Meanwhile, a method for preparing a thin film or a thick film according to the present invention is characterized in that it comprises the steps of: (1) aligning non-spherical silicalite-1 or zeolite beta seed crystals on at least one surface of a substrate such that one or more or all of the a-axis, b-axis and c-axis of the seed crystals are oriented according to a predetermined rule; and (2) exposing the aligned seed crystals to the synthetic gel of the present invention previously described, and forming and growing the film from the seed crystals by a secondary growth method.

In the present invention, the seed crystals and the formed film may be zeolite or a zeotype molecular sieve. For example, when silicalite-1 seed crystals are used, a film formed therefrom may also have an MFI structure.

The "substrate" that can be used in step (1) may be a porous or non-porous support. Preferred examples of a substrate suitable for use in the present invention are as follows:

1) oxides that contain one or more selected from among various metals and non-metal elements, including silicon (Si), aluminum (Al), titanium (Ti), fluorine (F), tin (Sn) and indium (In), and have a hydroxyl group on the surface, for example, quartz, mica, glass, various conductive glass such as indium tin oxide (ITO)-deposited glass, tin oxide ($SnO_2$) or F-doped tin oxide, silica, porous silica, alumina, porous alumina, titanium dioxide, porous titanium dioxide, and silicon wafers;

2) non-metals, metals and metal alloys fabricated to have a non-porous or porous structure, which comprise one or more elements selected from silicon (Si), aluminum (Al), titanium (Ti), iron (Fe), tin (Sn), gold (Au), silver (Ag), platinum (Pt) and stainless steel;

3) metals or alloys thereof, such as gold, silver, copper and platinum, which bond with a thiol group (—SH) or an amine (—$NH_2$) group;

4) polymers having various functional groups on the surface, for example, polyvinyl chloride (PVC) and Merrifield peptide resins;

5) semiconductors, such as zinc selenide (ZnSe), gallium arsenide (GaAs) and indium phosphide (InP);

6) natural or synthetic zeolites and zeotype molecular sieves; and 7) natural polymers, such as cellulose, starches (amylase and amylopectin) and lignin, synthetic polymers, and conductive polymers, which have surface hydroxyl groups or can be treated to have hydroxyl groups.

More preferred substrates are oxides containing one or more of porous and non-porous metals, alloys, metals and non-metal elements with various shapes. Still more preferred are quartz, mica, glass, various conductive glass, such as ITO glass, tin oxide or F-doped tin oxide, or silica. Glass is most preferred.

Meanwhile, step (1) of the method for preparing a thin film or a thick film according to the present invention is characterized in that non-spherical seed crystals that are to be used as templates for secondary growth are aligned on a substrate such that one or more or all of the a-axis, b-axis and c-axis of the crystals are oriented according to a predetermined rule.

For example, the seed crystals may be aligned on the substrate in a manner such that all the a-axes of the seed crystals are oriented parallel to one another, all the b-axes of the seed crystals are oriented parallel to one another, or all the c-axes of the seed crystals are oriented parallel to one other, or a combination thereof.

Moreover, the seed crystals may be aligned on the substrate such that the a-, b- or c-axes are oriented normal to the surface of the substrate.

Meanwhile, seed crystals, aligned on a substrate such that one or more or all of the a-, b- and c-axes of the seed crystals are oriented according to a predetermined rule, and preferably form a monolayer.

After the seed crystals are placed on the substrate, the orientation of the a-axes, b-axes or c-axes of the seed crystals can be aligned by physical pressure.

Korean Patent Laid-Open Publication No. 2009-120846 discloses a method of vertically orienting all the b-axes of MFI-type seed crystals on a substrate, and a technology capable of controlling the orientation of the a-, b- and/or c-axes of crystals on a substrate are disclosed in PCT/KR2010/002180 and PCT/KR2010/002181. Thus, seed crystals, aligned such that at least one or all of the a-, b- and c-axes of the seed crystals are oriented, can be prepared according to the methods described in Korean Patent Laid-Open Publication No. 2009-120846, PCT/KR2010/002180 and PCT/KR2010/002181 or using a modification of these methods.

Specifically, seed crystals, aligned on a substrate in step (1) such that all the a-, b- and c-axes thereof are oriented, can be prepared by the following processes:

Process 1

A process comprising the steps of:

A) preparing a substrate, the surface of which has formed thereon depressions or projections capable of fixing the position and orientation of seed crystals; and B) placing seed crystals on the substrate, and then applying physical pressure to the seed crystals to insert a portion or the whole of each seed crystal into each of pores defined by the depressions or the projections.

Process 2

A process comprising the steps of:

(A) preparing a template, the surface of which has formed thereon depressions or projections capable of fixing the position and orientation of seed crystal;

(B) placing seed crystals on the template, and then applying physical pressure to the seed crystals to insert a portion or the whole of each seed crystal into each of pores defined by the depressions or the projections to thereby align the seed crystals on the template; and (C) bringing the template having the seed crystals aligned thereon into contact with a substrate to transfer the seed crystals onto the substrate.

In the above processes, the shape of the pore preferably corresponds to the shape of a specific portion of each seed crystal which is inserted into the pore in order to control the orientations of the seed crystals.

Also, the physical pressure may be applied by rubbing or pressing against the substrate.

Meanwhile, the substrate or the template can form hydrogen bonds, ionic bonds, covalent bonds, coordination bonds or van der Waals bonds with the seed crystals by the physical pressure applied.

The depressions or projections formed on the surface of the substrate or the template can be printed directly on the substrate, formed using a photoresist, formed by laser ablation after coating with a sacrificial layer, or formed by inkjet printing.

Although photoresists or ink may be removed after aligning the seed crystals on the substrate, it may also be present as a support for the seed crystals during the secondary growth process. The seed crystals aligned on the substrate in step (1) may be in contact with or spaced apart from the seed crystals adjacent thereto; however, photoresist or ink is required to have a sufficient thickness so as to act as a support for the seed crystals during the secondary growth process, and for this reason, the seed crystals are preferably spaced apart from one other.

Before step (1), a coupling agent capable of binding to the substrate and the seed crystals may be applied to the substrate surface. As used herein, the term "coupling agent" refers to any compound having an end functional group, which enables coupling between the substrate and the seed crystals. Preferred coupling agents and the mechanisms of action and applications thereof are disclosed in Korean Patent Laid-Open Publication No. 2009-120846 and U.S. Pat. No. 7,357,836.

Non-spherical silicalite-1 or zeolite beta seed crystals that are used in the present invention are ordered porous materials having channels running along the a-axis, b-axis and/or c-axis in the crystals (FIGS. 1A, 1B and 1C).

In step (2) of the method according to the present invention, a secondary growth from the seed crystal surface using the synthetic gel, which does not induce crystal nucleation in a solution for crystal growth or on the seed crystal surface, enables the seed crystals to be connected to one another two-dimensionally while growing vertically to form a three-dimensional structure, thereby forming the film.

Herein, because silicalite-1 or zeolite beta seed crystals are ordered porous materials having channels formed in the crystals, the channels in the seed crystals can extend to a film formed from the seed crystals.

For example, the film, formed in an area in which the orientations of the axes of seed crystals adjacent to one another are uniform, may have: prepared by extension of channels continuously connected to one another in an axial direction parallel to the substrate surface; prepared by extension of channels continuously connected to one another in an axial direction perpendicular or inclined with respect to the substrate surface; or prepared by both.

The method according to the present invention preferably further comprises, before step (2), a step of removing an amorphous silica layer formed on the surface of the seed crystals.

In the initial period after the development of gel compositions, the present inventors routinely observed that the uniformly oriented SL films became contaminated with small randomly oriented crystals as the film thickness increased (FIG. 21). Later the present inventors figured out that the surfaces of the seed crystals become covered with an amorphous silica layer with a thickness of about 7 nm (FIG. 22) during the processes of monolayer assembly by rubbing and subsequent calcination to affix them onto substrates, and that the outermost amorphous silica layer was mainly responsible for the adsorption of the contaminant. The outermost amorphous silica layers can be effectively removed by treating the calcined SL seed crystals with a 0.2 M $NH_4F$ solution for 6 hours. The newly exposed b-oriented faces (FIG. 22) serve as the true template surface for the subsequent growth of the SL films in the b-orientation, maintaining uniformity up to thicknesses of 8 μm. Without this treatment, the b-oriented films became contaminated with small randomly oriented crystals as the thickness increased.

In the method of the present invention, the temperature of a reaction for film formation and growth may vary from 50° C. to 250° C. depending on the composition of seed crystal growth solution used or the material to be prepared. The reaction temperature is preferably 80° C. to 200° C., and more preferably 120° C. to 180° C. In addition, the reaction temperature doesn't have to be fixed during the whole process, but can be changed stepwise during the reaction.

In the method of the present invention, the time of the reaction for film formation and growth may vary from 0.5 hours to 20 days. The reaction time is preferably 2 hours to 15 days, more preferably 6 hours to 2 days, and most preferably 10 hours to 1 day.

The film prepared according to the present invention can be used in various applications, including membranes for molecular separation, low dielectric materials in the semiconductor industry, nonlinear optical materials, membranes for water electrolysis, thin films for solar cells, optical parts, interior and exterior parts for aircrafts, cosmetic containers, household containers, mirrors, and other membranes utilizing the characteristics of nanopores of zeolites, but is not limited thereto.

Advantageous Effects

The use of the synthetic gel of the present invention can induce only secondary growth from the surface of silicalite-1 (SL) or zeolite beta (BEA) seed crystals without inducing crystal nucleation in the synthetic gel or on the seed crystal surface. Accordingly, a thin film or thick film prepared according to the present invention has channels connected in a perpendicular direction, and thus can provide a 2-NLO thin film and a membrane for the separation of a mixture of ortho- and para-xylenes.

Figure 4:
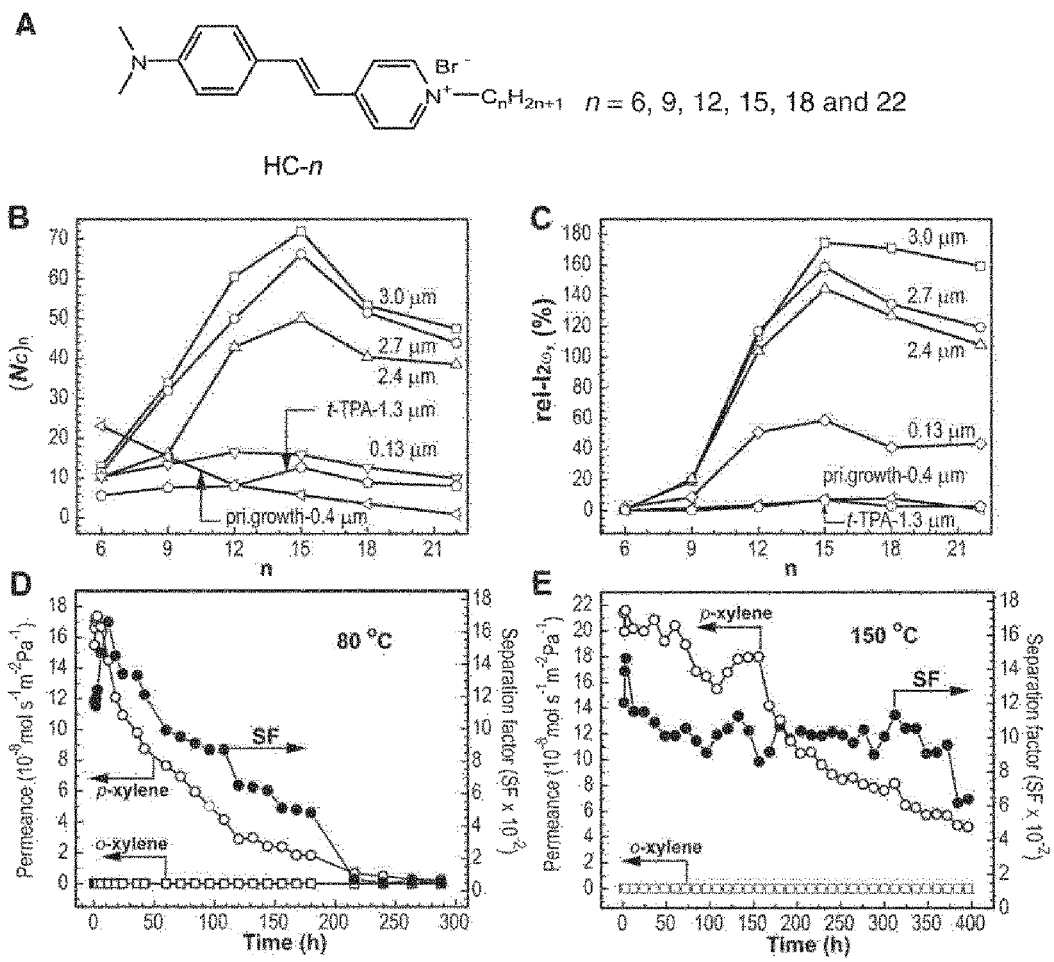
FIG. 4 shows (A) structure of HC-n dyes and (B) Plots of the number of HC-n dyes incorporated in a single channel $(N_C)_n$ of the SL film versus the alkyl chain length n of the HC-n dye. (C) shows plots of the relative second harmonic intensity (rel-$I_{2\omega}$) of the HC-n-incorporating SL films (of indicated thickness) with respect to a reference (3-mm-thick Y-cut quartz) versus the alkyl chain length n of the HC-n dye. Below are plots of permeances and the SF of p- (open circle) and o-xylene (open square) with time at the two operation temperatures, (D) 80° C. and (E) 150° C.
Figure 5:
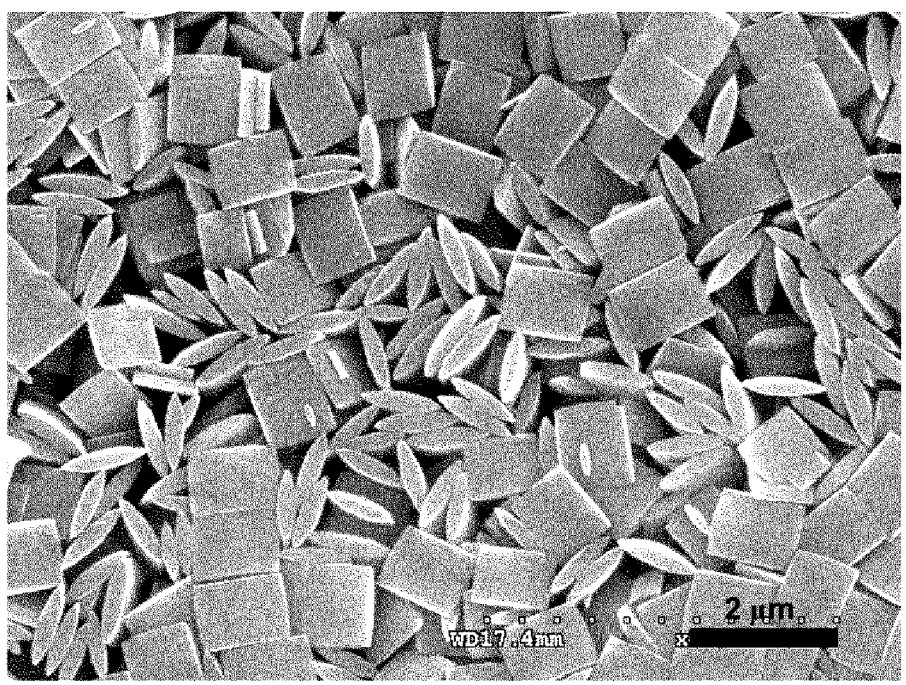
FIG. 5 is a SEM image of leaflet shaped SL crystals used in the present invention.
Figure 6:
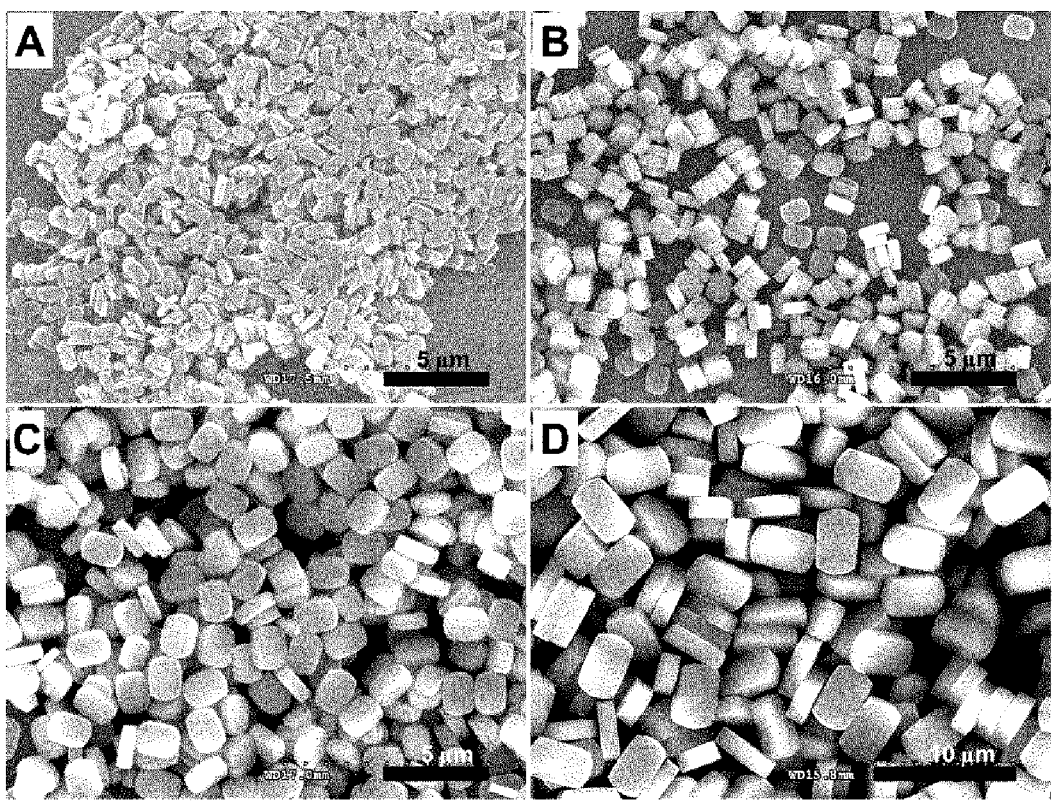
FIG. 6 shows SEM images of SL crystals with the sizes of 0.35×0.12×0.7 mm³ (A), 1.0×0.5×1.4 mm³ (B), 1.5×0.6× 1.9 mm³ (C), and 2.8×1.1×4.8 mm³ (D).
Figure 7:
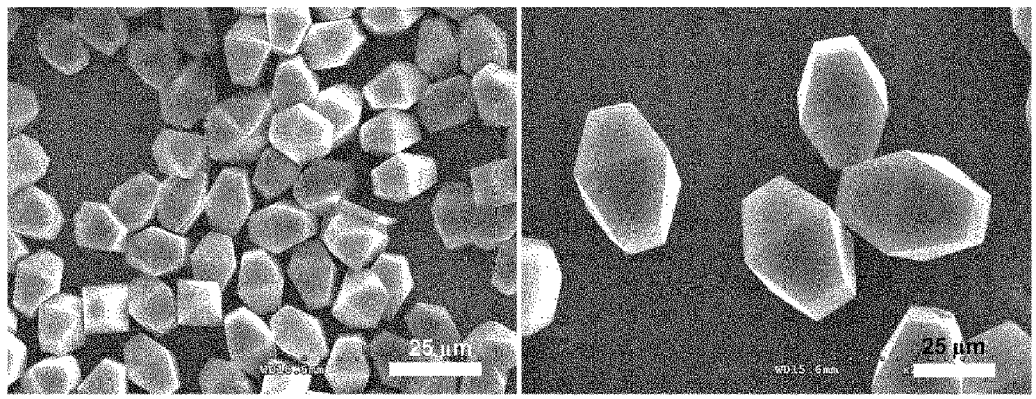
FIG. 7 shows SEM images of Si-BEA crystals with the size of 14×14×19 μm³ in two different magnifications.
Figure 22:
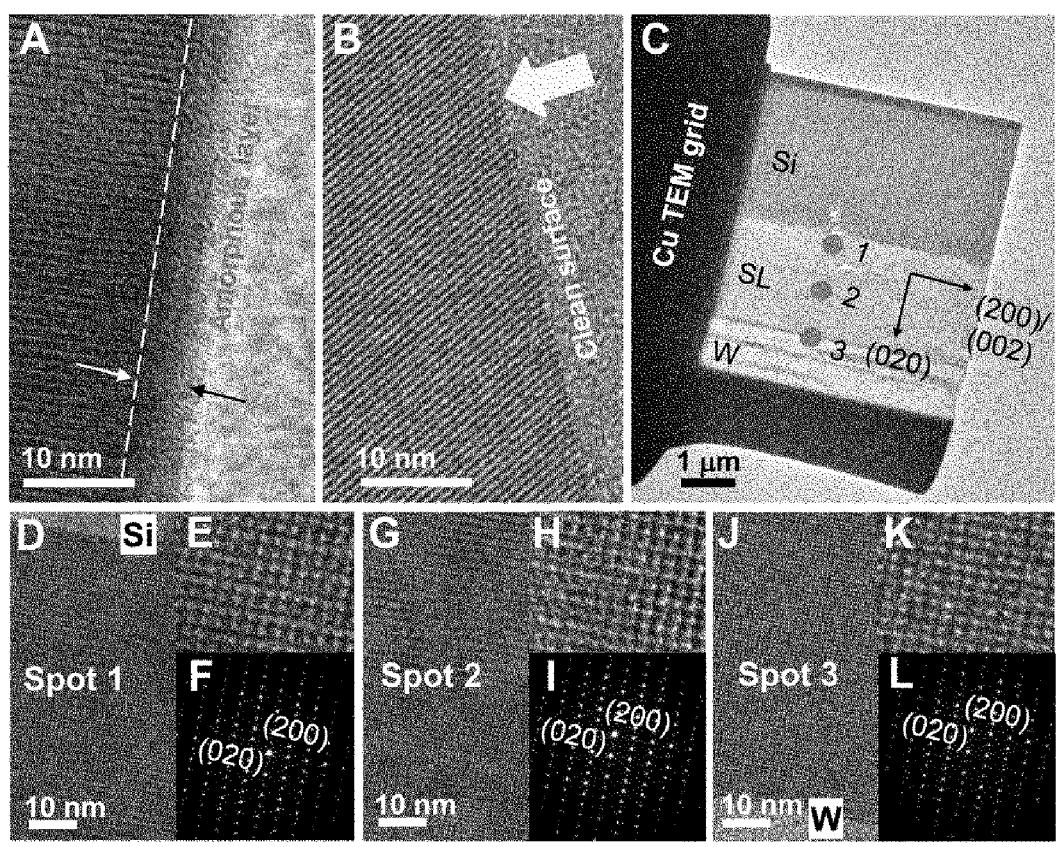
FIG. 22 shows typical cross-sectional images of a SL crystal attached to the monolayer by rubbing before (a) and after (b) washing the monolayer with a 0.2 M NH$_4$F solution for 6 h. It also shows a piece of a uniformly b-oriented SL film grown on a Si wafer prepared by a focused ion beam (FIB) cutter and mounted to a copper TEM grid with W as the glue (c). A 1.2-µm thick W layer was deposited onto the SL film layer prior to cutting the SL film. The selected area electron diffraction (SAED) patterns were taken from three spots. It shows a lattice image of the SL film in Spot 1 (d) and its expanded image (e) and the SAED pattern of Spot 1 (f). It shows a lattice image of the SL film in Spot 2 (g) and its expanded image (h) and the SAED pattern of Spot 2 (i). It shows a lattice image of the SL film in Spot 3 (j) and expanded image (k) and the SAED pattern of Spot 3 (l).

Uniformity of b-orientation was further supported by the analyses of the cross sections of the films (FIG. 22C) with a high resolution transmission electron microscopy. Thus, the lattice fringes and selected area electron diffraction patterns of the cross sections of the films are identical regardless of the spots within the film (FIGS. 4, D to L), confirming once again that the SL films grow in perfect b-orientation (from the Si layer to W layer in FIG. 18C) regardless of the depth of the film. When the direction from the Si layer to W layer is b-axis direction, the direction being perpendicular to the Cu TEM grid could be either a-axis or c-axis direction. The observed lattice fringes and selected area electron diffraction patterns (FIGS. 22, F, I, and L) coincide with the case where the direction normal to the Cu TEM grid is the c-axis direction, indicating that the particular small portion of the SL film cut by a focused ion beam happens to be oriented with the c-axis normal to Cu TEM grid.

Figure 23:
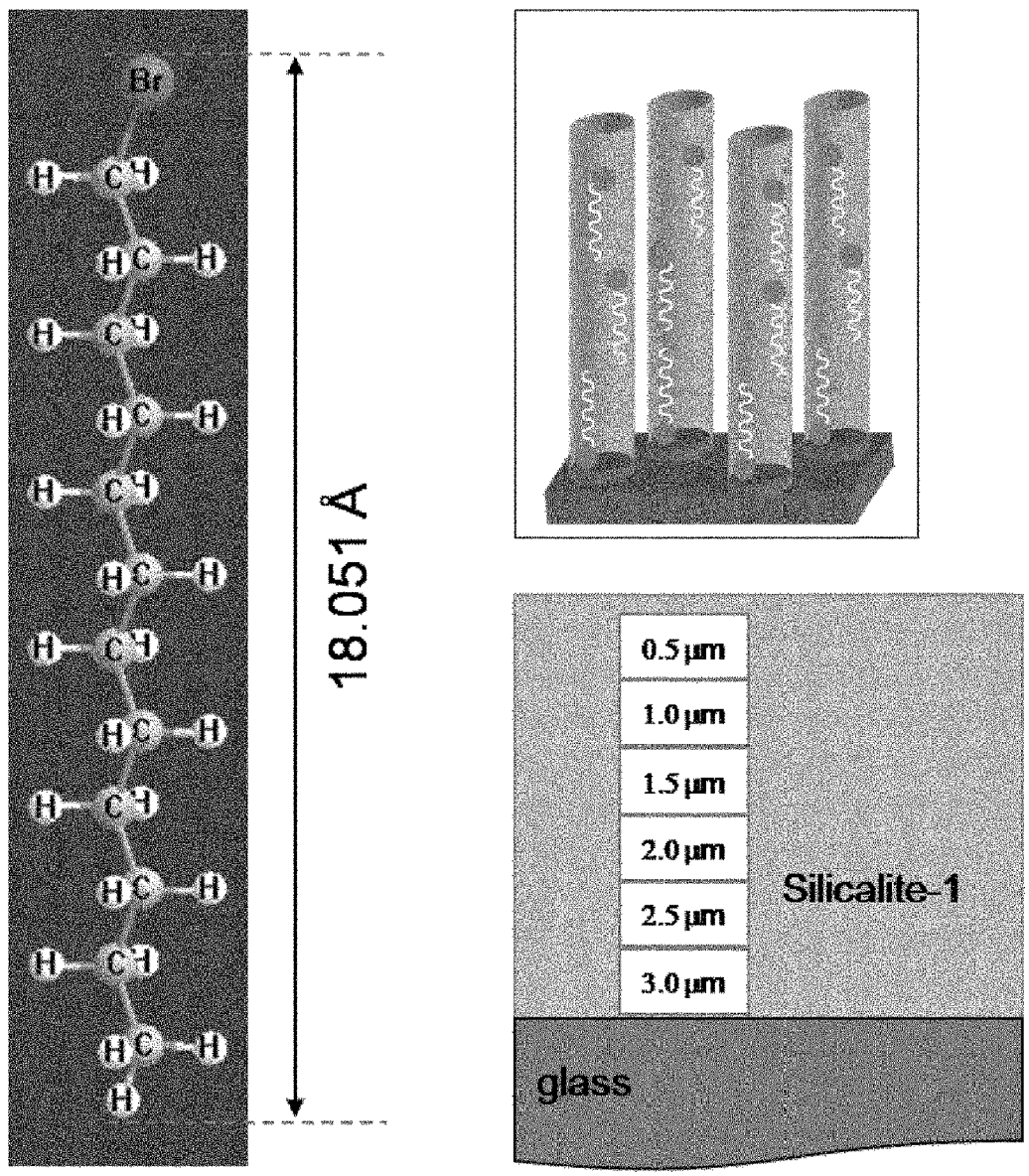

FIG. 23 shows (A) Illustration of the structure of 1-bromododecane prepared by Chem Draw showing its total length of 18.051 Å, (B) Illustration of 1-bromododecane molecules included in SL channels, and (C) Illustration of a side view of a perfect b-oriented 3-µm thick SL film supported on glass and the areas in the film where Br-to-Si atomic ratios were measured using an EDX equipped in the SEM.

Figure 24:
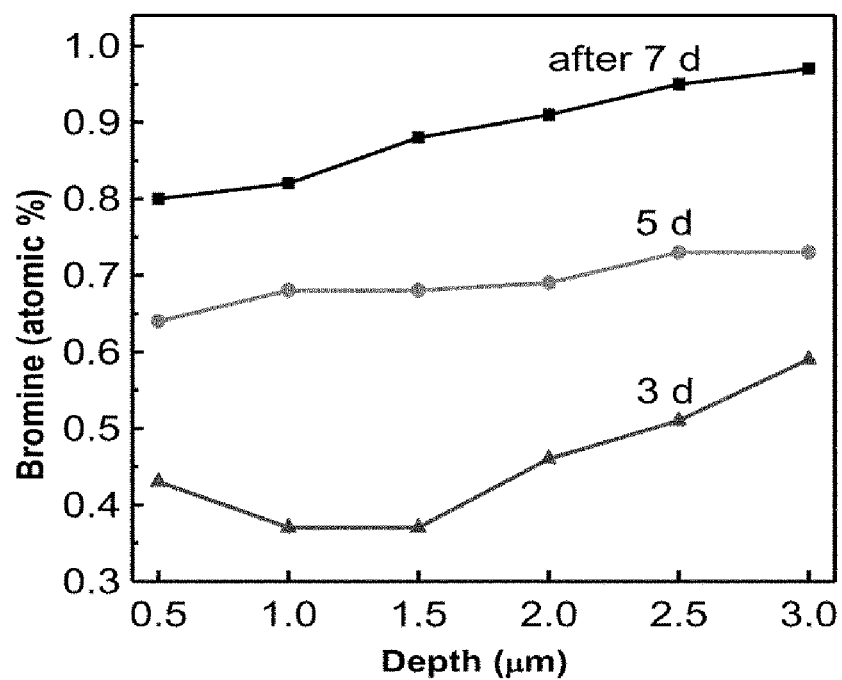

FIG. 24 is a plot of Br content (atomic %) versus film depth for the three cases with different incorporation time.

Figure 25:
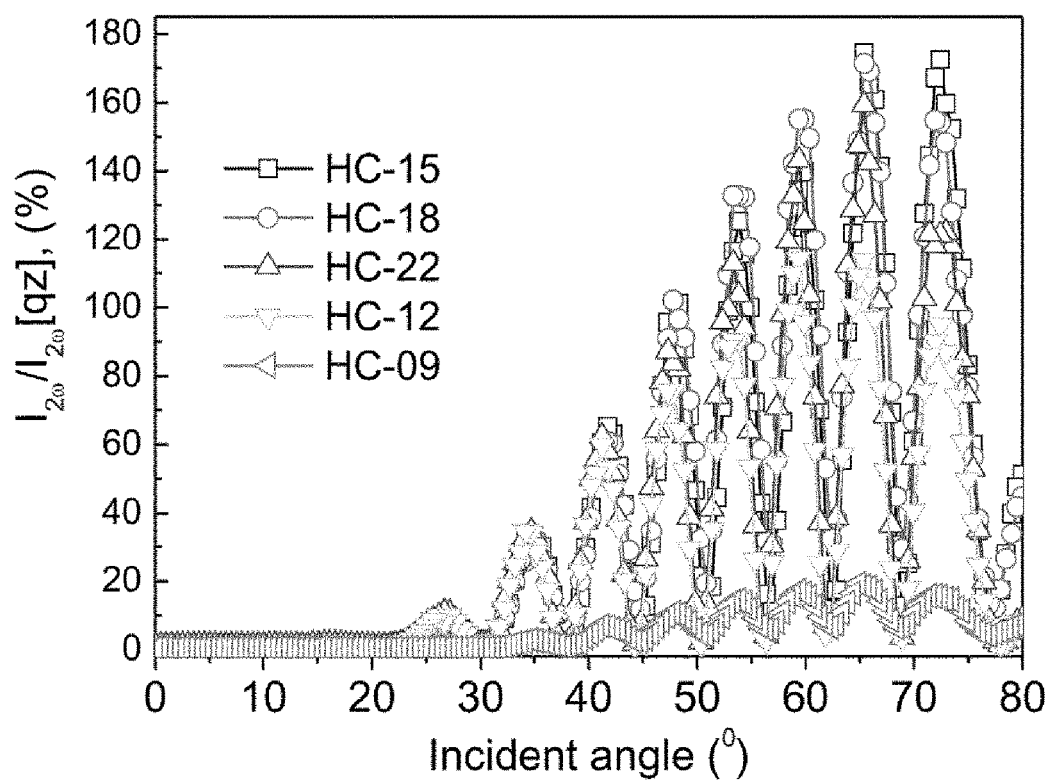

FIG. 25 shows Maker fringes of the 3-µm thick b-SL$_f$/g/ b-SL$_f$ plates incorporated with HC-n (n=9, 12, 15, 18, and 22) dyes. The Maker fringe appears because the uniformly b-oriented SL films are coated on both sides of the 1-mm thick glass plate.

Figure 26:
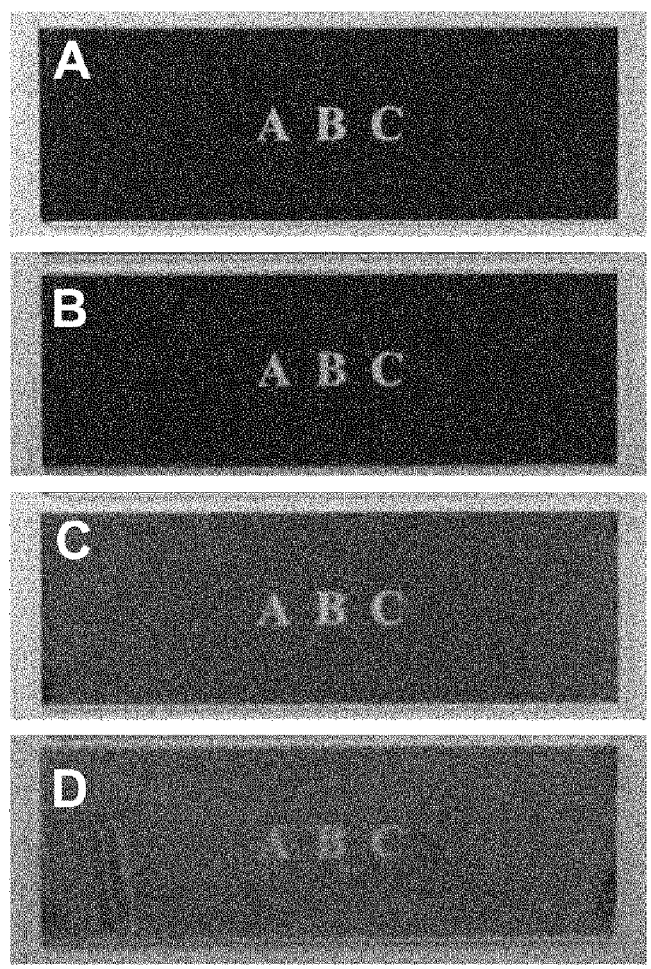

FIG. 26 shows digital camera images of a clean bare glass plate with the thickness of 1 mm (A) and the same glass plates coated with three different types of SL films which were prepared by secondary growth of b-SL$_m$/g plates in three different gels, Gel-2 (B), t-TPA gel (C), and TPA gel (D).

Figure 27:
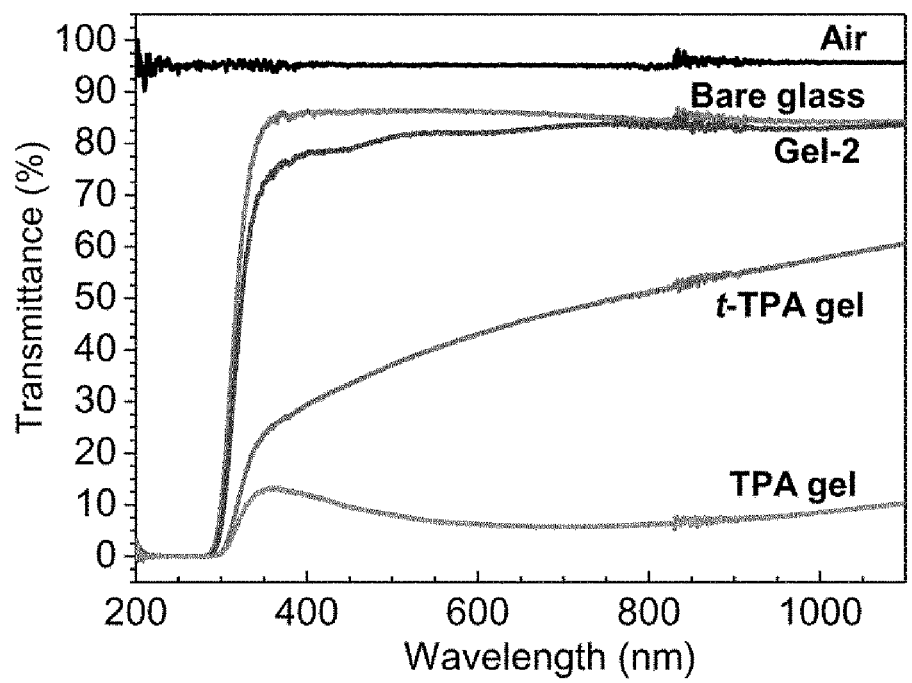

FIG. 27 shows transmittance spectra of air, a clean bare glass plate, and three glass plates coated with three different types of SL films which were prepared by secondary growth of b-SL$_m$/g plates in three different gels, Gel-2, t-TPA gel, and TPA gel.

MODE FOR INVENTION

Hereinafter, the present invention will be described in more detail with reference to examples. However, these examples are for illustrative purposes only, and the scope of the present invention is not limited to these examples.

Materials

Aqueous tetramethylammonium hydroxide (TMAOH, 25%, Sigma-Aldrich), aqueous tetraethyl ammonium hydroxide (TEAOH, 35%, Alfa), aqueous tetrapropyl ammonium hydroxide (TPAOH, 1M, Sigma-Aldrich), tetra-n-butylammonium hydroxide (TBAOH, 40%, Sigma-Aldrich), ammonium hexafluoro silicate [(NH4)2SiF6, 98%, Sigma-Aldrich)], tetraethylorthosilicate (TEOS, 98%, Acros-Organic), and n-hexane (HPLC grade, ≥95%, Sigma-Aldrich), Fluorescein free acid [2-(6-Hydroxy-3-oxo-(3H)-xanthen-9-yl) benzoic acid 95%, Aldrich], HF (48-51%, A. C. S. reagent, J. T. Baker) were purchased and used as received. Slide glass plates with the sizes of 75 25 1 mm3 were purchased from Marienfeld. bis-N,N-(tripropylammoniumhexamethylene) di-N, Npropylammoniumtrihydroxide (trimer-TPAOH) was synthesized according to the procedure known in the art (Z. P. Lai, M. Tsapatsis, J. R. Nicolich, Adv. Funct. Mater. 14, 716 (2004)).

Preparation Example 1: Preparation of Leaflet Shape SL Seed Crystals

Leaflet shape SL crystals with the average size of 0.3× 1.3×1.5 µm$^3$ were synthesized according to the procedure known in the art (Z. P. Lai, M. Tsapatsis, J. R. Nicolich, Adv. Funct. Mater. 14, 716 (2004)). For this, a gel consisting of TEOS, trimer-TPAOH, KOH and distilled deionized water (DDW) was prepared, where the molar ratio of the gel in terms of TEOS:trimer-TPAOH:H2O:KOH was 4.0:0.5: 950.0:0.8. The rest of the procedure is the same with the procedure for the secondary growth of a-SL$_M$/g in TPAOH gels. The SL powder sedimented at the bottom of the autoclave was collected by centrifugation, washed with DDW to remove the mother liquor. The washed leaflet shape SL crystals were dried at 100° C. by placing them in an oven.

Preparation Example 2: Preparation of Rounded Coffin Shape SL Seed Crystals in Four Different Sizes Rounded coffin shape SL crystals with the average size of 0.35×0.12×0.7 µm$^3$ were synthesized from a gel composed of TEOS, TPAOH, and H$_2$O with the mole ratio of 6:3:330.

The SL crystals with the average size of 1.0×0.5×1.4 μm³ were synthesized from a gel composed of TEOS, TPAOH, and H2O with the mole ratio of 6:1.28:620. The SL crystals with the average size of 1.5×0.6×1.9 μm³ were synthesized from a gel composed of TEOS, TPAOH, and $H_2O$ with the mole ratio of 6:0.9:620. The above synthetic gels were prepared by introducing TEOS into the solution containing TPAOH and $H_2O$. The mixture transformed into a clear gel after stirring for 24 h at room temperature. The clear gel was filtered through a filter paper (Whatman® No. 5) and charged into a Teflon-lined autoclave. The hydrothermal reaction was carried out at 150° C. for 12 h with vigorous stirring with the aid of a magnetic stirrer.

The rounded coffin shape SL crystals with the average size of 2.8×1.1×4.8 μm³ were synthesized from a gel composed of TEOS, TPAOH, TPAOH, ethylene glycol (EG), and H2O with the mole ratio of 6:0.9:0.6:24:600. The gel was prepared by first adding 31.8 g of TEOS to the solution containing TPAOH (22.5 mL), H2O (247 mL), and EG (37.2 g). The mixture was stirred for 24 h at room temperature, and TPAOH (6.17 mL) was added into the mixture. The clear gel was aged for 12 h more at room temperature. The obtained clear gel was filtered through a filter paper (Whatman No. 5) and charged into a Teflon lined autoclave containing a magnetic stirring bar. The hydrothermal reaction was carried out at 150° C. for 12 h with stirring at the spin rate of 490 rpm.

The obtained crystals were thoroughly washed with copious amounts of DDW to remove the mother liquor. The crystals were then re-dispersed into a 25% TMAOH solution and shaken for 6 h to remove amorphous nanoparticles adsorbed on the crystals. The TMAOH-treated crystals were washed with DDW until the supernatant solution became neutral. The washed crystals were dried at 100° C. by placing them in an oven overnight.

Preparation Example 3: Preparation of Pure Silica Beta Zeolite Seed (Si-BEA) Seed Crystals Si-BEA zeolite was synthesized according to the procedure described in the art with some modifications (O. Larlus, V. Valtchev, Microporous Mesoporous Mater. 93, 55 (2006)). The gel consisting of fumed silica, TMAOH, $(NH_4)_2 SiF_6$, KOH and DDW was prepared, where the molar ratio of the gel in terms of fumed silica:TEAOH:$(NH_4)_2 SiF_6$:KOH:$H_2O$ was 4.00:1.92:0.36:0.40:31.20. The gel was prepared as follows.

(I) Preparation of the fumed silica/TMAOH solution (solution I): TMAOH (35%, 12.62 g), DDW (0.91 g) and KOH (95%, 0.60 g) were sequentially added into a plastic beaker and continuously stirred by magnetic stirrer. Fumed silica ($SiO_2$, 6.01 g) was slowly added within 30 min with continuous stirring until all $SiO_2$ became dissolved. This mixture was stirred for an additional 10 min until it became a clear yellow and viscous solution.

(II) Preparation of the TEAOH/$(NH_4)_2 SiF_6$ solution (solution II): TEAOH (35%, 7.57 g), (NH4)2SiF6 (1.64 g) were introduced into a plastic beaker and stirred until it became a homogeneous gel.

Solution II was transferred into solution I with vigorously stirring. The mixture was stirred for an additional 1 h until it solidified. The solidified mixture was aged under a static condition for 24 h. After aging, the solid gel was ground using a food mixer until it became a pale yellow dry powder. It was transferred and packed into a Teflon-lined autoclave. The hydrothermal reaction was carried out at 165° C. After 7 days of reaction, the autoclave was removed from the oven and quickly cooled to room temperature by running tap water over it. The obtained crystals were thoroughly washed with copious amounts of DDW and dried at 100° C. by placing them into an oven overnight.

Example 1:

1-1. Preparation of Glass Plates Coated with a-Oriented Monolayer of Silicalite-1 Crystals (a-$SL_m$/g Plates)

Slide glass plates were washed by first placing them in a Piranha solution for 45 min followed by rinsing them with copious amounts of DDW. The rinsed glass plates were dried by blowing $N_2$. The clean glass plates were coated with a thin layer of PDMS (polydimethylsilane) by spin coating a PDMS solution (0.1% in Hexane) at spin rate of 2,500 rpm for 15 sec. The PDMS layer was cured at 80° C. for 1 h and etched with $O_2$ plasma etching for 30 sec to make the surface hydrophilic. On the hydrophilic PDMS coated glass plates a solution of PEI in ethanol (0.1% PEI) was coated by spin coating at the rate of 2,500 rpm for 15 sec.

Onto the PEI-coated glass plates leaflet shape SL crystals were rubbed using a flat PDMS mold. The glass plates coated with the monolayer of leaflet shape SL crystals were (denoted as a-SLm/g) calcined at 500° C. for 10 h. The rate of temperature increase from the room temperature to 500° C. was 1.2° C./min and after calcination the temperature of the furnace was decreased back to room temperature with the same rate of 1.2° C./min. After calcination, the supported seed crystals were washed by placing the glass plates in a magnetically stirred NH4F solution (0.2 M) for 4 h. After treatment with the $NH_4F$ solution, the a-$SL_M$/g monolayers were washed with copious amounts of DDW, and dried by blowing $N_2$ gas.

1-2. Secondary Growth of b-$SL_m$/g Plates in Gel-1

Gel-1 consisting of fumed silica, TEAOH, $(NH_4)_2SiF_6$, KOH, and $H_2O$ with a mole ratio of 4.00:1.92:0.36:0.40:$n_1$, where $n_1$=30° C. to 80 was prepared as follows. (A typical procedure)

(I) Preparation of the fumed silica/TEAOH solution (solution I): TEAOH (35%, 12.62 g), DDW (0.91 g) and KOH (95%, 0.60 g) were sequentially added into a plastic beaker and continuously stirred with the help of a magnetic stirrer. Fumed silica ($SiO_2$, 6.01 g) was slowly added into the above solution during the period of 30 min with continuous stirring until all $SiO_2$ became dissolved. This mixture was stirred for additional 2 min until it became clear yellow and viscous.

(II) Preparation of the TEAOH/$(NH_4)_2 SiF_6$ solution (solution II): TEAOH (35%, 7.57 g), $(NH_4)_2SiF_6$ (1.64 g) were introduced into a plastic beaker and stirred until they became homogeneous.

Solution II was transferred into solution I with vigorously stirring. The mixture was stirred for an additional 1 h until it solidified. The solidified mixture was aged under a static condition for 12 h. After aging, the solid gel was ground using a food mixer until it became pale yellow dry powder. It was transferred into a Teflon-lined autoclave. The a-$SL_m$/g plates were placed vertically inside the solid gel. To induce good contacts between a-$SL_m$/g plates and the solid gel, the autoclave was tapped by gently hitting the bench top. The sealed autoclaves were placed in an oven preheated 150° C. After desired periods of time, the autoclaves were removed from the oven and quickly cooled to room temperature by running tap water onto them. The perfect a-oriented films supported on glass (denoted as a-$SL_f$/g) were removed from autoclaves and washed with DDW to clean the surface, and dried by blowing $N_2$ gas.

Figure 1:
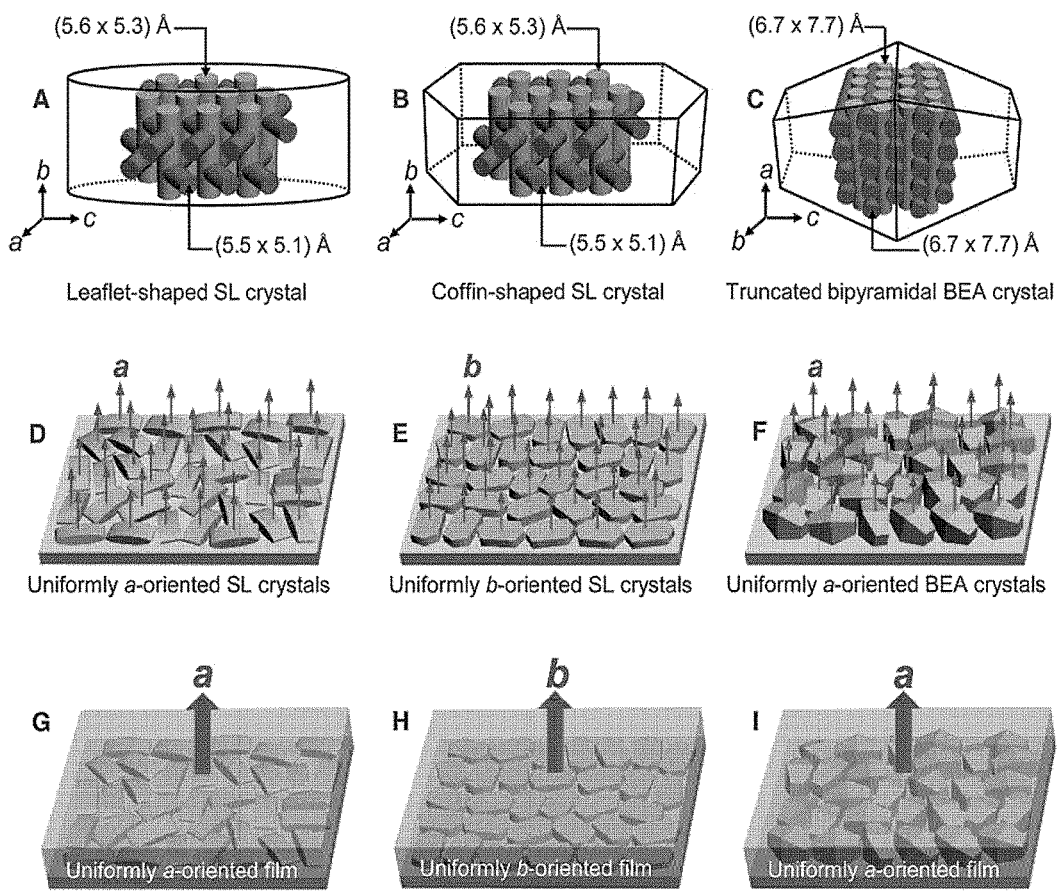
FIG. 1 is a schematic illustration of (A) leaflet-shaped crystals and (B) coffin-shaped SL crystals and (C) truncated bipyramidal BEA crystals and their channel systems, as well as their respective (D) a-oriented, (E) b-oriented, and (F) a-oriented monolayers. (G) to (I) show that secondary growth on these monolayers produces uniformly oriented films.
Figure 2:
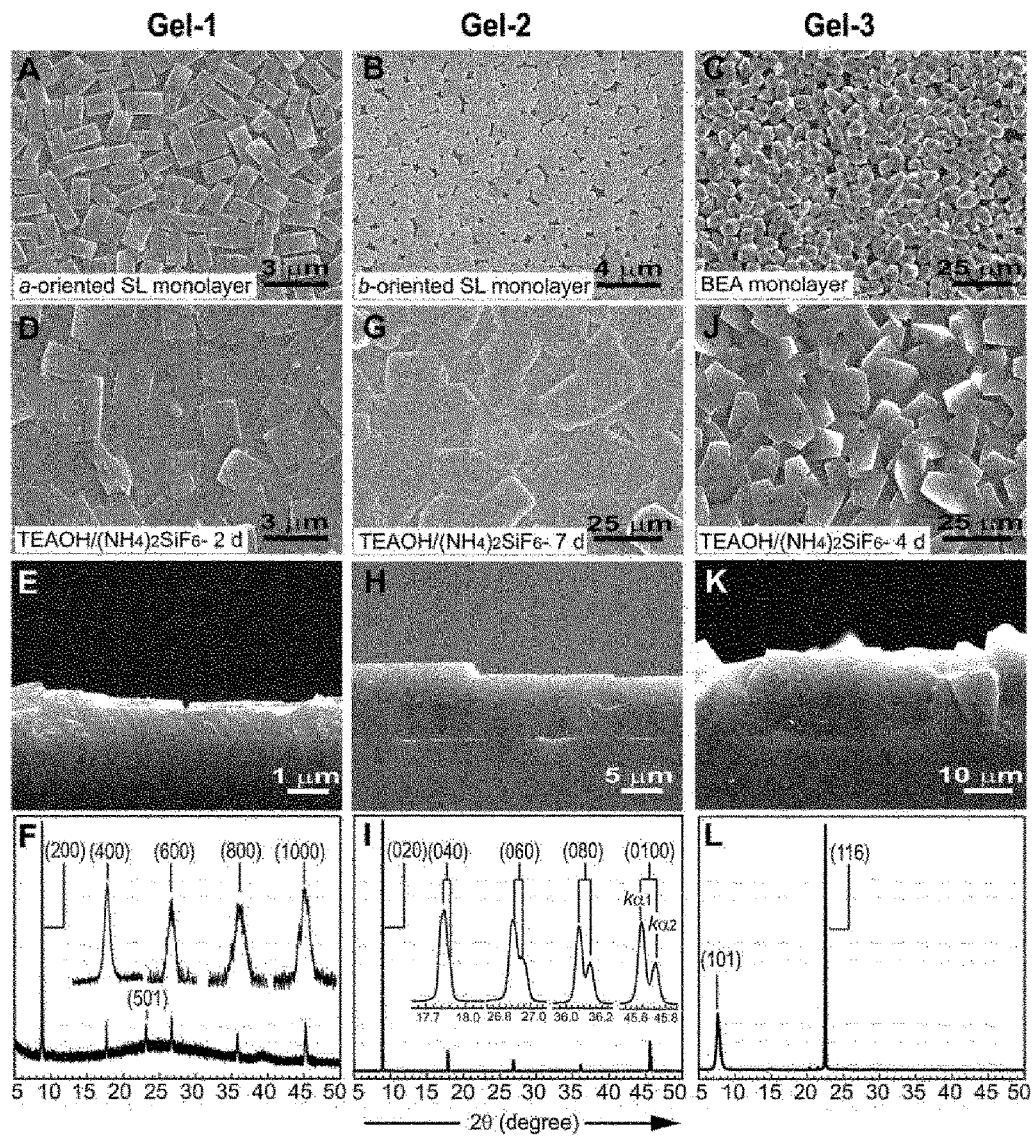
FIG. 2 shows SEM images of typical (A) a-oriented monolayers and (B) b-oriented monolayers of SL crystals and (C) a monolayer of a-oriented Si-BEA crystals assembled on glass plates. Shown below are the respective (D, G, and J) top-view SEM images, (E, H, and K) side-view SEM images, and (F, I, and L) x-ray diffraction patterns of the uniformly oriented continuous films grown on these monolayers under the conditions indicated.

When secondary growth on the glass-supported SL leaflet monolayer (a-$SL_m$/g) was conducted in gel-1 at 150° C. according to the method of Example 1, nearly perfectly a-oriented continuous films steadily grew with time on the a-oriented seed monolayers (despite the fact that gel-1 was a dry powder) as demonstrated by the top (FIG. 2D) and side (FIG. 2E) scanning electron microscopy (SEM) views of a film grown over 2 days. The x-ray diffraction pattern of the film (FIG. 2F) shows peaks assigned to diffraction from the (200), (400), (600), (800), and (1000) planes. The weak (501) plane diffraction arises from the slight tilt of the leaflet SL crystals in the monolayers.

Example 2:

2-1. Preparation of Glass Plates Coated with b-Oriented Monolayer of Silicalite-1 Crystals (b-$SL_m$/g Plates)

Monolayers of rounded coffin shape SL crystals were assembled on clean slide glass plates (denoted as b-$SL_m$/g) by directly rubbing the seed crystals on glass plates with a finger, without coating the glass plates with any polymer glue. The monolayer coating was conducted on both sides of the glass plates (denoted as b-$SL_m$/g/b-$SL_m$) when the glass plates coated with continuous films of perfect b-oriented SL films were used as the host materials for the production of 2-NLO films. Otherwise, the monolayer coating was conducted only one side of each glass plate. The b-$SL_m$/g and b-$SL_m$/g/b-$SL_m$ plates were calcined in a furnace at 550° C. for 10 h. The rate of temperature increase from the room temperature to 550° C. was 1.2° C./min and after calcinations the temperature of the furnace was decreased back to room temperature with the same rate 1.2° C./min.

2-2. Secondary Growth of b-$SL_m$/g Plates in Gel-2

Gel-2 consisting of TEOS, TEAOH, $(NH_4)_2SiF_6$, KOH, and $H_2O$ with a mole ratio of 4.00:1.92:0.36:$n_2$, where $n_2$=40° C. to 80 was prepared as follows. (A typical procedure)

(I) Preparation of the TEOS/TEAOH solution (solution I): TEAOH (35%, 20.2 g) and DDW (22.2 g) were sequentially added into a plastic beaker containing 31.8 g of TEOS (98%). This beaker containing the above solution was tightly covered using plastic wrap and magnetically stirred for about 30 min until the solution became clear.

(II) Preparation of the TEAOH/$(NH_4)_2SiF_6$ solution (solution II): TEAOH (35%, 10.1 g), $(NH_4)_2SiF_6$ (2.45 g), and DDW (11.1 g) were introduced into a plastic beaker and stirred until all $(NH_4)_2SiF_6$ dissolved.

Solution II was quickly poured into solution I with vigorously stirring. The mixture solidified immediately. The solidified mixture was stirred for an additional 2 min using a plastic rod, and aged under a static condition for 6 h. After aging, the semisolid gel was ground using a food mixer and transferred into a Teflon-lined autoclave. The b-$SL_m$/g plates were placed vertically within the semisolid gel. The sealed autoclaves were placed in an oven preheated at desired temperatures. After desired periods of time, the autoclaves were removed from the oven and quickly cooled to room temperature by running tap water onto them. The perfect b-oriented SL films supported on glass (denoted as b-$SL_f$/g) were removed from autoclaves and washed with DDW to clean the surface. After cleaning the films by sonication in a sonic bath charged with DDW for 1 min, they were washed with DDW, and dried under the stream of $N_2$ gas. The obtained b-$SL_f$/g plates were calcined at 550° C. for 15 h under the oxygen flow to remove $TEA^+$ ions from the channels. The rate of temperature increase from the room temperature to 550° C. was 1° C./min and after calcination the temperature of the furnace was decreased back to room temperature with the same rate. The calcined films were washed with the 0.2 M $NH_4F$ solution for 6 h and subsequently with copious amounts of water to remove the amorphous silica layers or particles from film surfaces to expose channel openings to the atmosphere.

When secondary growth on the coffin-shaped SL monolayer (b-$SL_m$/g) was conducted in semisolid gel-2 at 165° C. according to the method of Example 2, perfectly b-oriented continuous films steadily grew with time on the b-oriented seed monolayers, as demonstrated by the top (FIG. 2G) and side (FIG. 2H) SEM views of a film grown over 7 days. The x-ray diffraction pattern of the film (FIG. 2I) only shows the diffraction peaks from the (020), (040), (060), (080), and (0100) planes. The splitting of the latter four diffraction peaks is due to the presence of two different wavelengths in the x-ray source (Cu $K\alpha_1$ and $K\alpha_2$).

Example 3:

3-1: Preparation of Glass Plates Coated with a-Oriented Monolayer of Si-BEA Crystals (a-Si-$BEA_m$/g)

A PEI solution in ethanol (0.3% PEI) was coated on clean slide glass plates by spin coating at the spin rate of 2,500 rpm for 15 sec. Monolayers of truncated bipyramid shape Si-BEA crystals on the PEI-coated slide glass plates were prepared by rubbing Si-BEA crystals with a latex glove wearing finger. The glass plates coated with the monolayer of Si-BEA crystals (denoted as a-Si-$BEA_m$/g) were calcined in a furnace at 550° C. for 24 h. The rate of temperature increase from the room temperature to 550° C. was 1.2° C./min and after calcinations the temperature of the furnace was decreased back to room temperature with the same rate 1.2° C./min.

3-2. Secondary Growth of a-Si-$BEA_m$/g Plates in Gel-3

The a-oriented continuous Si-BEA film on glass plates (denoted as a-Si-$BEA_f$/g) was prepared from Gel-3 (TEOS:TEAOH:HF:$H_2O$=4.00:2.20:2.20:$n_3$, where $n_3$=30-40). The gel was prepared as follows.

TEAOH (35%, 23.14 g) and TEOS (98%, 21.2 g) were introduced into a plastic beaker. This beaker containing the above solution was tightly covered using plastic wrap and magnetically stirred for about 30 min until the solution became clear. HF (50%, 2.20 g) was added drop-wise into the above clear solution with vigorous stirring. The mixture solidified immediately. The solidified mixture was stirred for additional 2 min using a plastic rod, and aged under a static condition for 5 h. After aging, the semisolid gel was ground using a food mixer and transferred into a Teflon-lined autoclave. The a-Si-$BEA_m$/g plates were placed vertically within the semisolid gel. The sealed autoclaves were placed in an oven preheated to 150° C. After 4 days of reaction time, the autoclaves were removed from the oven and quickly cooled to room temperature by running tap water onto them. a-Si-$BEA_f$/g plates were removed from autoclaves, washed with DDW to clean the surface and dried by blowing $N_2$ gas.

When secondary growth on the Si-BEA monolayer (a-Si-$BEA_m$/g) was conducted in semisolid gel-3 at 150° C. according to the method of Example 3, nearly perfectly a-oriented continuous films steadily grew with time on the a-oriented seed monolayers, as demonstrated by the top (FIG. 2J) and side (FIG. 2K) SEM views of a film grown over 4 days. The x-ray diffraction pattern of the film (FIG. 2L) shows the diffraction peaks from the (101) and (116) planes but not from (h00) planes. This pattern is consistent because the Si-BEA crystals are lying on the substrate with one of the four trapezoidal faces parallel to the substrate surface.

Comparative Example 1: Secondary Growth of b-$SL_m$/g in a TPA Gel

For the secondary growth of b-$SL_m$/g plates in a TPA gel, a gel consisting of TEOS, TPAOH, and DDW was prepared, where the molar ratio of the gel in terms of TEOS:TPAOH:$H_2O$ was 4:1:600. TEOS (10.6 g) was added into the solution containing TPAOH (8.4 mL) and DDW (84 g). This mixture was stirred at room temperature for 12 h. The obtained clear gel was poured into a Teflon-lined autoclave containing a Teflon support having several b-$SL_m$/g plates. The b-$SL_m$/g plates were tilted by ~30 with the SL monolayer side tilted down. The secondary growth was carried out under a static condition in an oven preheated at 165° C. for desired periods of time. After reaction, the autoclave was removed from the oven and the reaction was quenched by quickly cooling the autoclave with running tap water. The glass plates coated with randomly oriented silicalite-1 crystals were removed from the autoclave and subsequently washed with copious amounts of DDW. The SL powder sedimented at the bottom of the autoclave was collected by centrifugation and washed several times with fresh DDW. The washed SL crystals were dried at 100° C. by placing them in an oven. The dried silicate-1 powder was weighed.

<Study>

According to the method of Comparative Example 1, the inventors conducted secondary growth on b-$SL_m$/g substrate using TPA gel under the conditions leading to the formation of seed crystals. The composition of the Si-BEA seed gel was the same as one of the compositions of gel-1. The key differences were that for seed crystal formation, the water content was set more precisely and the temperature was higher as 165° C.

Figure 3:
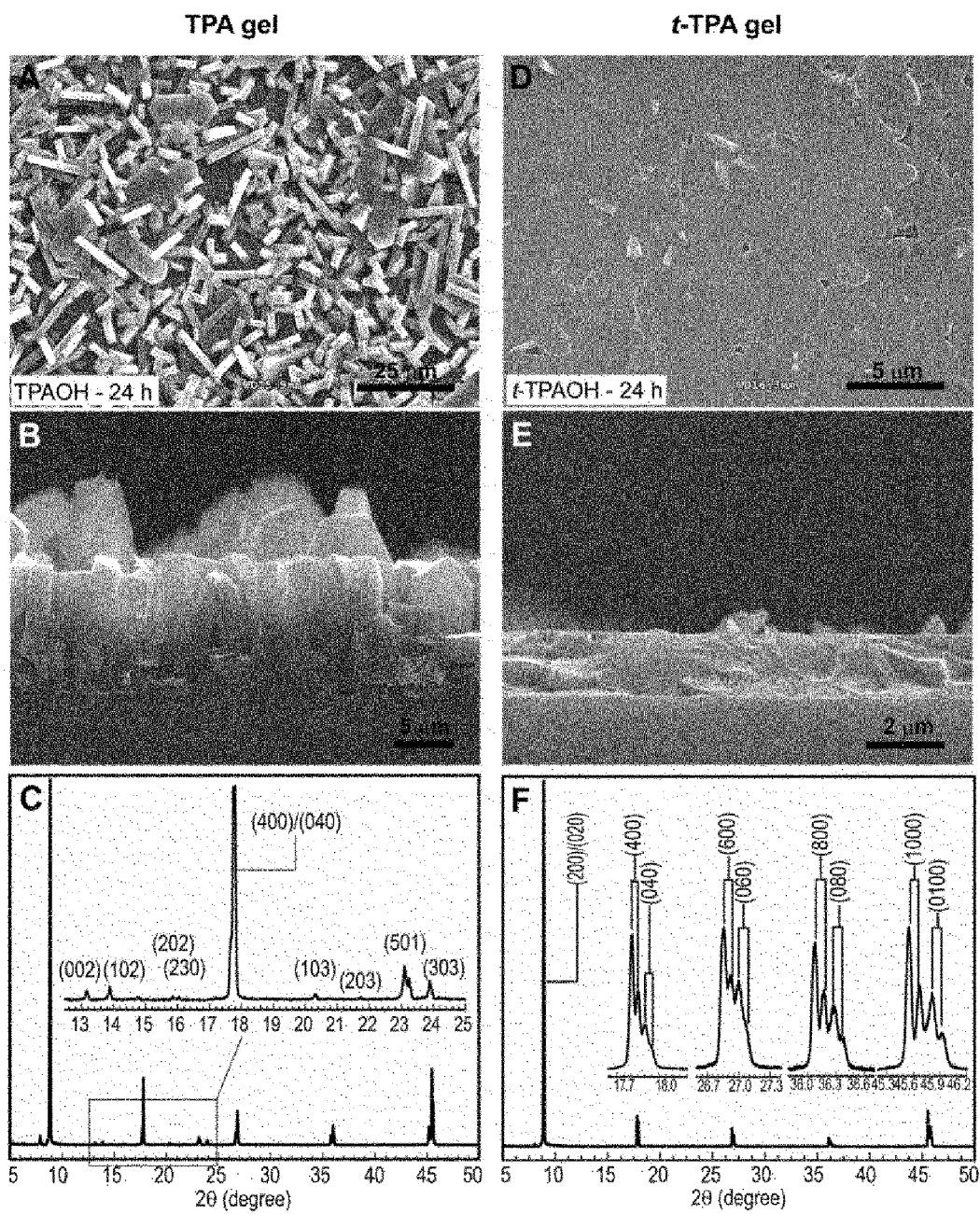
FIG. 3 shows respective (A and D) top-view and (B and E) side-view SEM images and (C and F) x-ray diffraction patterns of randomly oriented SL films supported on glass, obtained by secondary growth of b-$SL_m$/g in TPA gel; and randomly oriented SL films supported on glass, obtained by secondary growth of b-$SL_m$/g in t-TPA gel.
Figure 8:
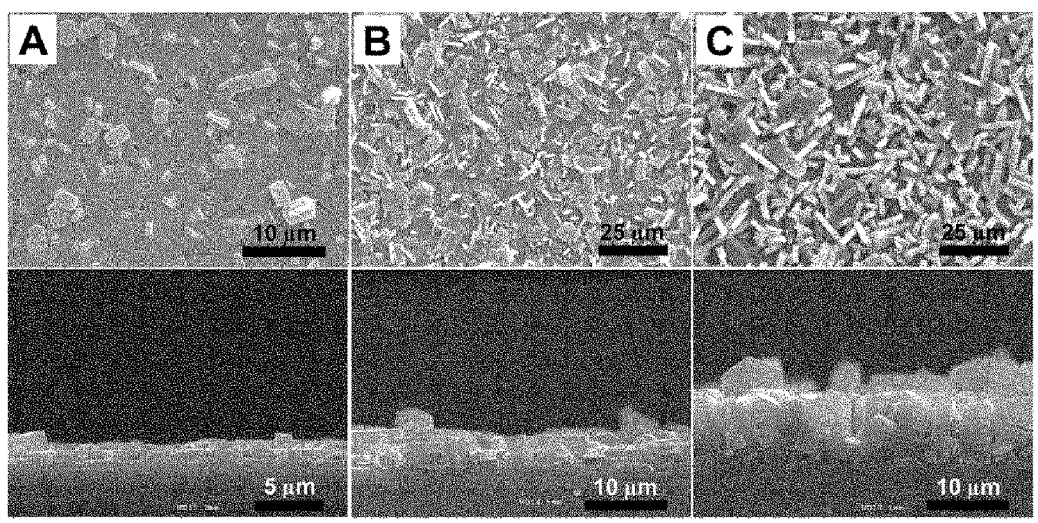
FIG. 8 shows SEM images (top and side views) of SL films supported on glass which were prepared from b-$SL_m$/g plates by secondary growth in a TPA gel (TEOS:TPAOH: $H_2O$=4:1:600) at 165° C. for 3 (A), 6 (B), and 24 h (C).

In the case of the secondary growth of b-$SL_m$/g plates in the TPA gel, the b-oriented seed crystals (1.0×0.5×1.4 μm$^3$) grew bigger even after only 3 hours at 165° C., leading to the formation of continuous films (FIG. 8). Simultaneously, a-oriented SL crystals also started growing on the b-oriented continuous films, and new b-oriented SL crystals became attached on the b-oriented films. As a result, the surface became very rough. After 24 hours, the film grew much thicker (~10 μm), but the orientations of the SL became highly random as the top (FIG. 3A) and side (FIG. 3B) SEM views show. The x-ray diffraction pattern of the film (FIG. 3C) correspondingly shows peaks arising from other orientations.

Figure 9:
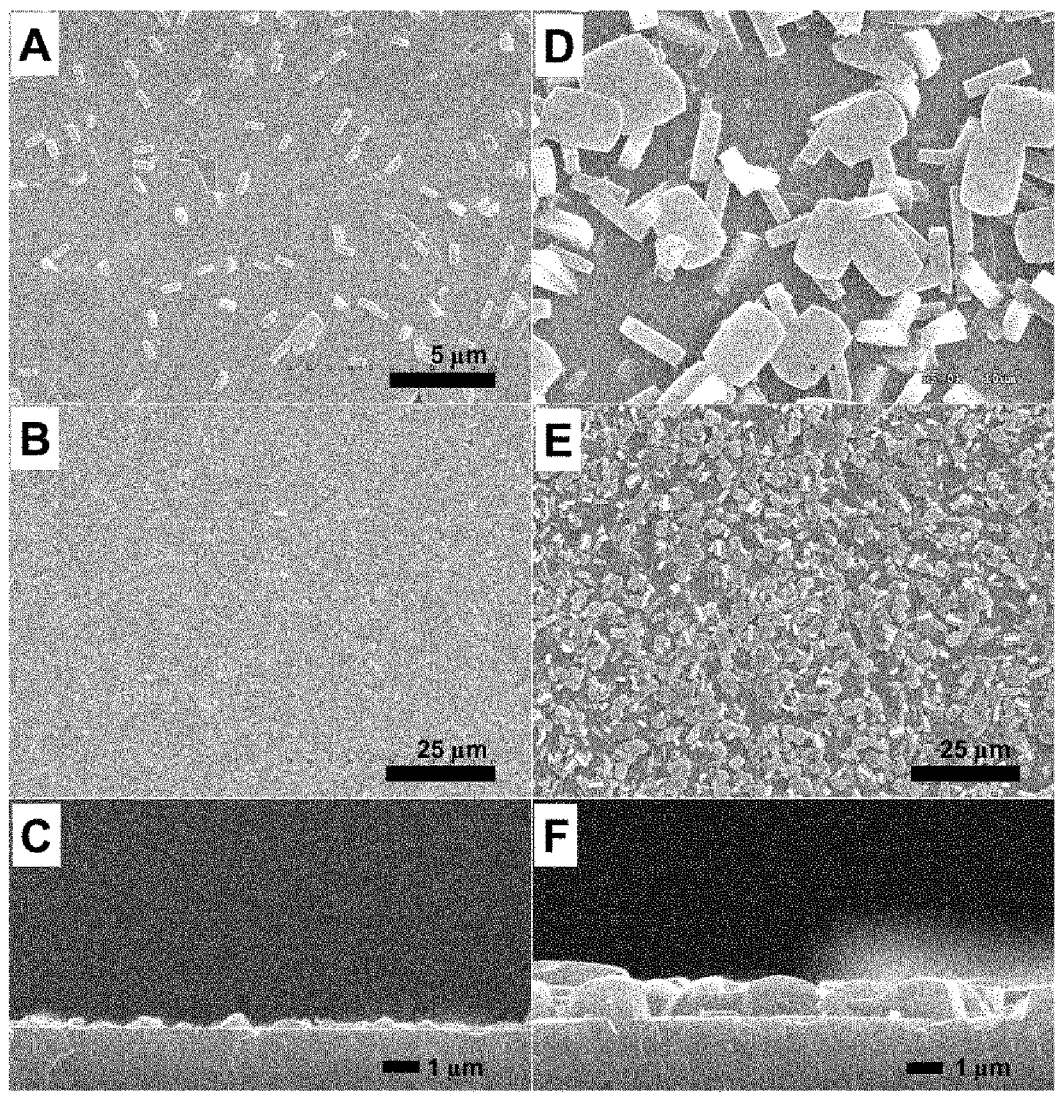
FIG. 9 shows SEM images of SL films prepared by secondary growth of b-$SL_m$/g plates in a TPA gel which was pre-heated at 150° C. for 2 h to consume most of the nutrients (in other words to dilute the concentration of the nutrients) according to the method described by Y. Liu, Y. S. Li, W. S. Yang, J. Am. Chem. Soc. 132, 1768(2010) after 3 h (A-C) and 6 h (D-F).

The degree of random orientation increases with time in the TPA gel. Because this phenomenon is unavoidable, attempts have been made to reduce the orientation randomization by conducting a short-period (3 hours) secondary growth in a highly nutrient-depleted TPAOH gel or in a gel with very low TPAOH concentration. However, careful analyses of the films produced by these methods revealed that randomly oriented impure crystals had already begun to form even during the 3-hour period, or the gaps between the crystals were not yet completely filled. After a longer period of time, however, the orientation randomization became more obvious (FIG. 9).

Comparative Example 2: Secondary Growth of b-$SL_m$/g in a t-TPA Gel

The secondary growth of b-$SL_m$/g plates in a t-TPA gel was carried out according to the literature procedure (Z. P. Lai, M. Tsapatsis, J. R. Nicolich, Adv. Funct. Mater.14, 716 (2004)). For this, a gel consisting of TEOS, trimer-TPAOH, and DDW was prepared, where the molar ratio of the gel in terms of TEOS:trimer-TPAOH:H$_2$O:KOH was 4.0:0.5: 950.0:0.8. The rest of the procedure is the same as the procedure for the secondary growth of b-$SL_m$/g in a TPA gels. The SL powder sedimented at the bottom of the autoclave was collected by centrifugation and washed with copious amounts of DDW to remove the mother liquor. The washed silicaite-1 crystals were dried at 100° C. by placing them in an oven. The dried silicaite-1 powder was weighed.

<Study>

Figure 10:
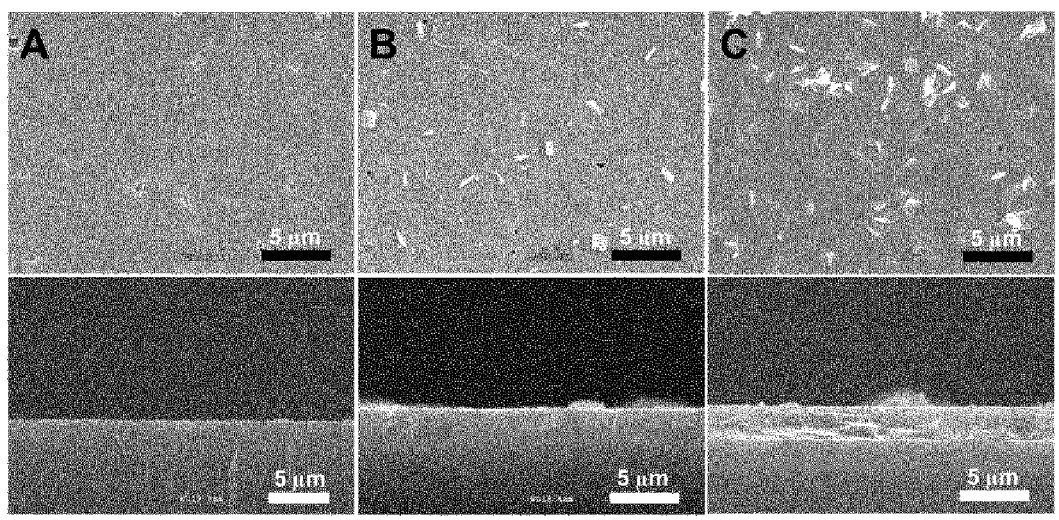
FIG. 10 shows SEM images (top and side views) of SL films prepared from b-$SL_M$/g by secondary growths in a t-TPA gel at 175° C. for 3 h (A), 12 h (B), and 24 h (C).

According to the method of Comparative Example 2, the inventors conducted secondary growth on b-$SL_m$/g substrate using TPA gel under the conditions leading to the formation of seed crystals. In the t-TPA gel at 175° C., most of the crystals interconnected very well even after 3 hours, giving rise to the formation of a very smooth continuous film as the top and the cross-sectional SEM views show (FIG. 10). During this period, the film thickness increased by 200 nm. Even after 24 hours, the film surface still remained smooth, as the top (FIG. 3D) and side (FIG. 3E) SEM images show, unlike the case of the TPA gel. However, the x-ray diffraction pattern of the SL film (FIG. 3F) showed that both a and b orientations coexisted. Specifically, the a:b orientation ratio was 7:3 despite the fact that the seed layer was perfectly b-oriented, indicating that leaf-shaped SL crystals produced in the bulk become readily attached to the b-oriented seed layer during the secondary growth.

Comparative Example 3

Figure 11:
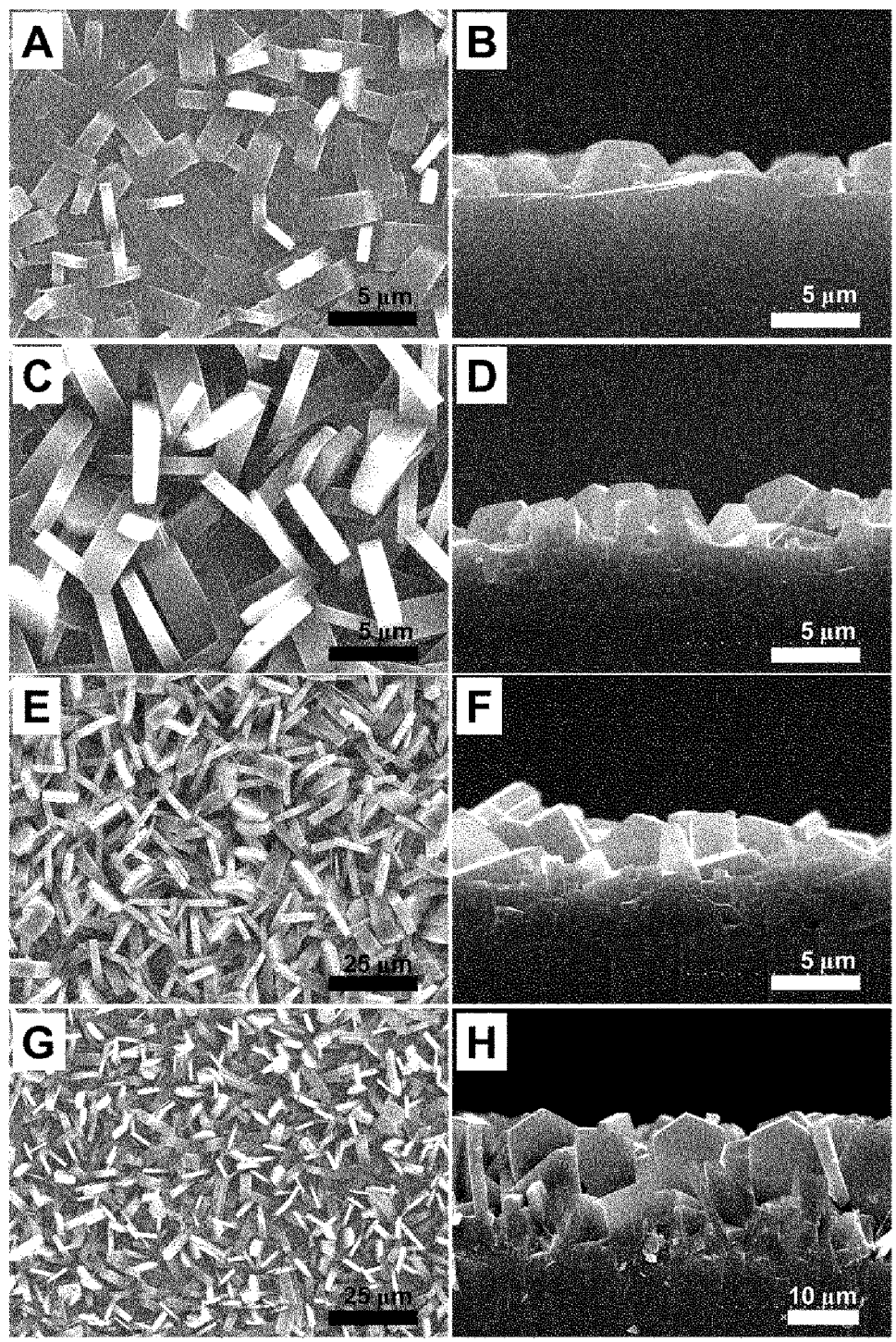
FIG. 11 shows SEM images (top and side views) of SL films prepared from a-$SL_m$/g plates by secondary growths in the TPA gel at 175° C. for 3 h (A, B), 6 h (C, D), 12 h (E, F), and 24 h (G, H).
Figure 12:
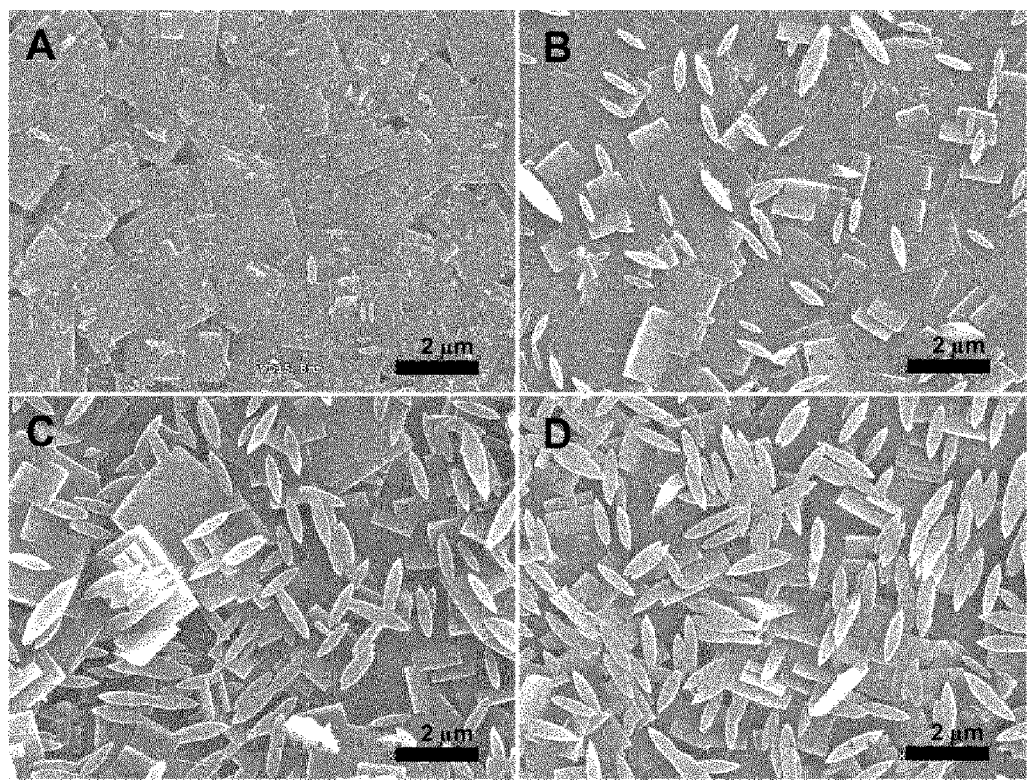
FIG. 12 shows SEM images of SL films prepared from a-$SL_m$/g plates by secondary growths in the t-TPA gel at 175° C. for 3 h (A), 6 h (B), 12 h (C), and 24 h (D).
Figure 13:
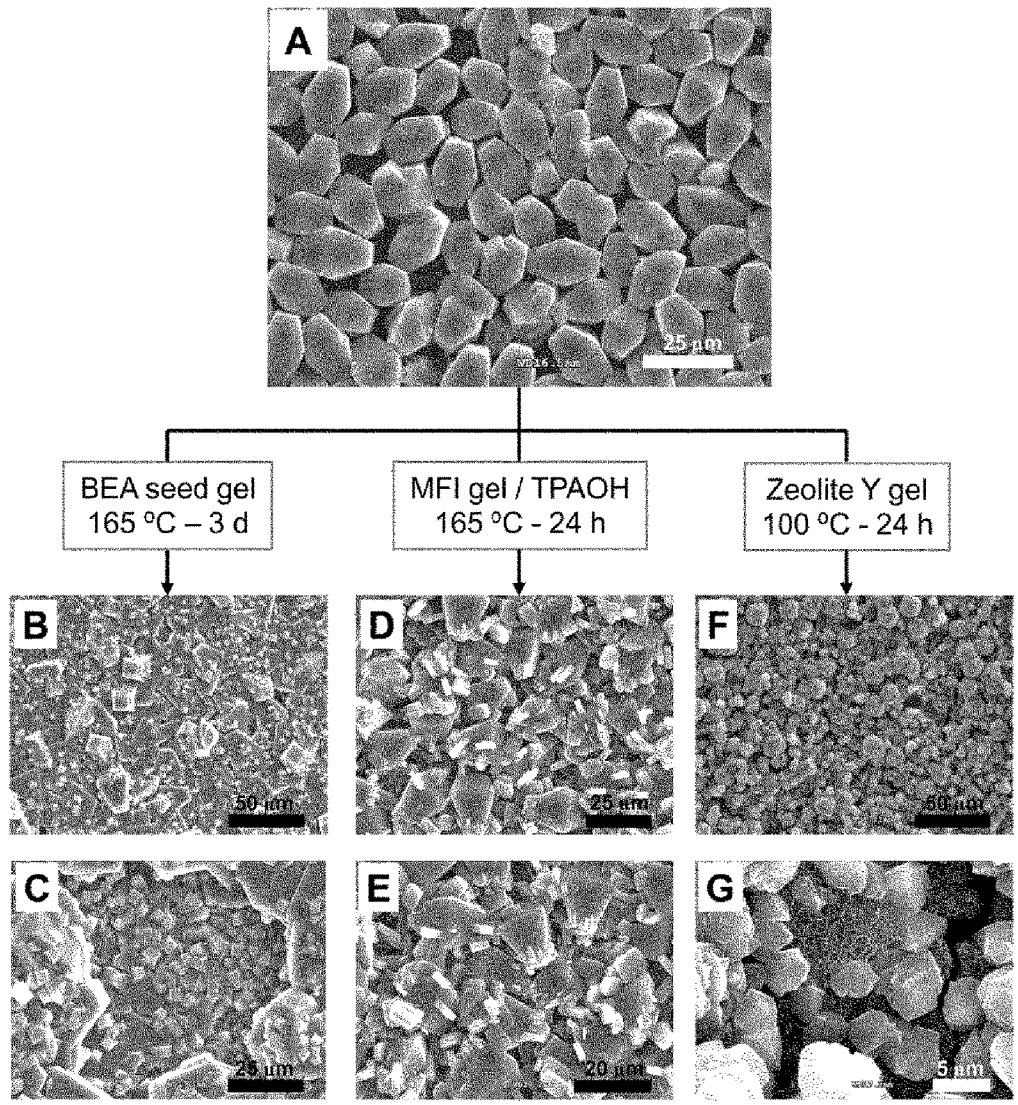
FIG. 13 shows SEM images of Si-BEA films prepared from a-Si-BEA/g plates (A) by secondary growths in the Si-BEA seed gel at 175° C. for 3 d (B, C), in the TPA gel at 175° C. for 24 h (D, E), and in a gel for the synthesis of zeolite Y (Y gel) at 100° C. for 24 h (F, G).
Figure 14:
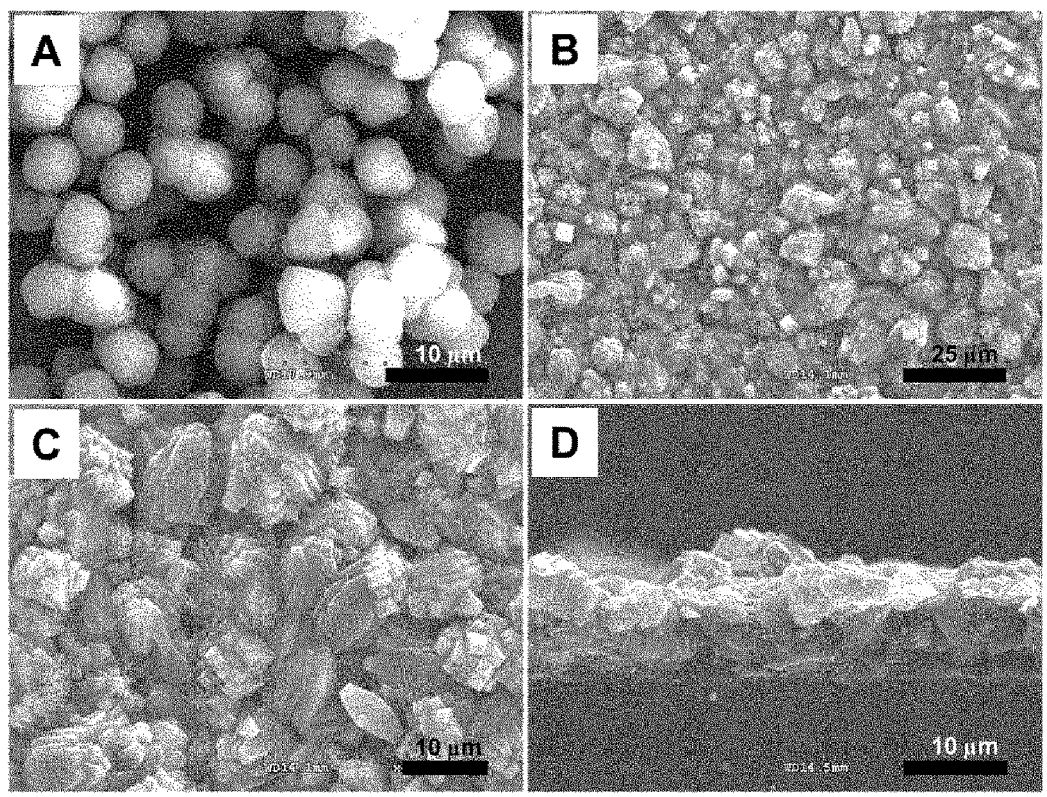
FIG. 14 shows SEM images of Si-BEA films prepared from randomly oriented-Si-BEA/g plates (A) by secondary growths in Gel-3 at 165° C. for 4 d. Top views with different magnifications (B, C) and side view (D).

In the case of a-$SL_m$/g plates, the use of TPA gel or t-TPA gel instead of gel-1 also led to randomly oriented SL films even after 3 hours at 175° C. (FIGS. 11 and 12). In the case of a-Si-BEA$_m$/g plates, the use of Si-BEA seed gel (the gel used to produce Si-BEA seed crystals) instead of gel-3 led to the formation of randomly oriented films (FIG. 13). Even if gel-3 was used for the secondary growth of a-Si-BEA$_m$/g plates, the resulting Si-BEA film became randomly oriented when monolayers of randomly oriented monolayer Si-BEA crystals were used (FIG. 14). The use of TPA gel led to the attachment of SL crystals on the surface, and the use of highly basic gel such as the gel for the preparation zeolite Y led to dissolution of the seed Si-BEA crystals (FIG. 13).

Study

A common phenomenon associated with the use of TPA and t-TPA gels is that during secondary growth, large amounts of SL crystals form by self-crystallization, independent of the film growth process. Here we define the selectivity of a gel to film formation ($S_f$ in percent) is defined as follows:

[Eq. 1]

$$S_f(\%) = \Delta W_f / (\Delta W_f + W_b) \times 100 \quad (1)$$

where $\Delta W_f$ represents the weight of SL film added onto the seed layer, and $W_b$ represents the weight of free SL powder produced in the bulk. In the case of TPA gel, $S_f$ values were 3.11 and 3.23% after 3 and 24 hours, respectively, with $\Delta W_f$ and $W_b$ values of 4.4 and 137.2 mg and 14.6 and 436.7 mg, respectively. In the case of t-TPA gel, $S_f$ values were 3.16 and 0.34% after 3 and 24 hours, respectively, with $\Delta W_f$ and $W_b$ values of 0.5 and 14.4 mg and 0.5 and 307.7 mg, respectively. Thus, in the cases of conventional gels, more than 96% of the nutrients were consumed for the production of SL crystals in the bulk by self-crystallization.

Figure 15:
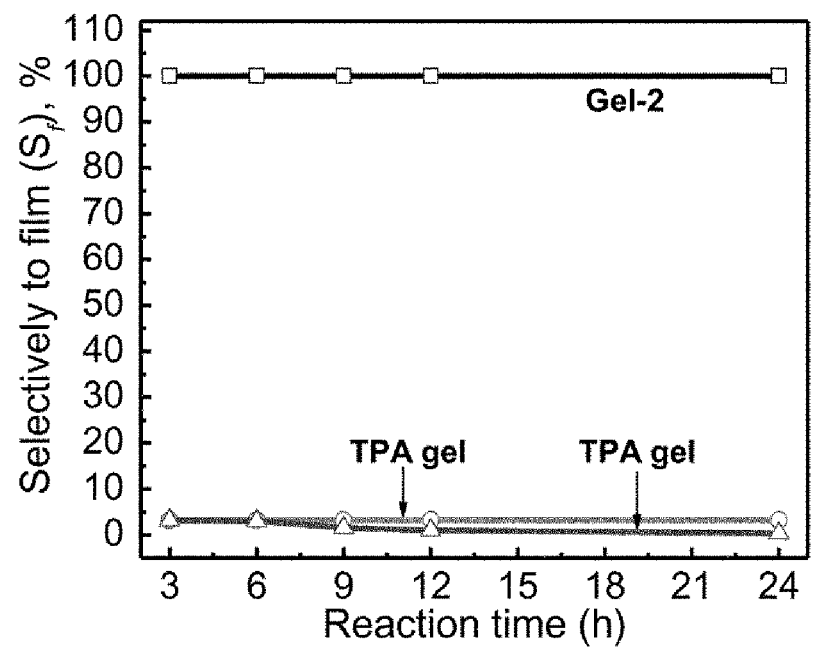
FIG. 15 is a plot of $S_f$ values with respect to the time of the cases of secondary growth of b-$SL_m$/g plates in Gel-2, TPA gel, and t-TPA gel.

In contrast, gel-1, gel-2, and gel-3 did not form new SL or Si-BEA crystals in the bulk during reaction periods monitored for up to 7 days. In other words, $S_f$ values were 100% in these three gels. As a typical example, the plots of $S_f$ values with respect to reaction time are compared in FIG. 15 for the secondary growths of b-$SL_m$/g in gel-2, TPA gel, and t-TPA gel.

Figure 16:
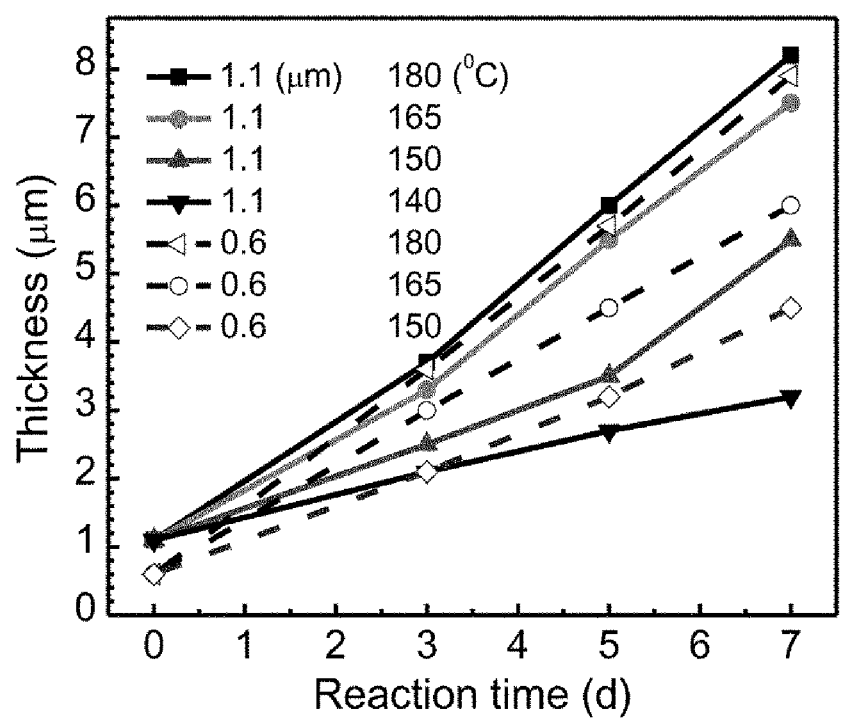
FIG. 16 is a plot of the thickness of the uniformly b-oriented SL film with respect to time during the secondary growth of b-$SL_m$/g plates having different initial thicknesses of SL seed crystals in Gel-2 at different reaction temperatures.

In the case of secondary growth of b-$SL_m$/g in gel-2, the thickness increased linearly with time for a given thickness of the seed crystal layer and a given reaction temperature, within experimental error (FIG. 16). This first-order kinetic behavior is consistent with the absence of selfcrystallization in the gel, a constant SL surface area, the same orientation of the SL surface, and the same reactivity of the SL surface in the same orientation toward the nutrients in the gel. This phenomenon furthermore allows precise control over the desired thickness of the uniformly oriented SL films, by choosing seed crystals with proper thickness, reaction time, and reaction temperature.

Figure 17:
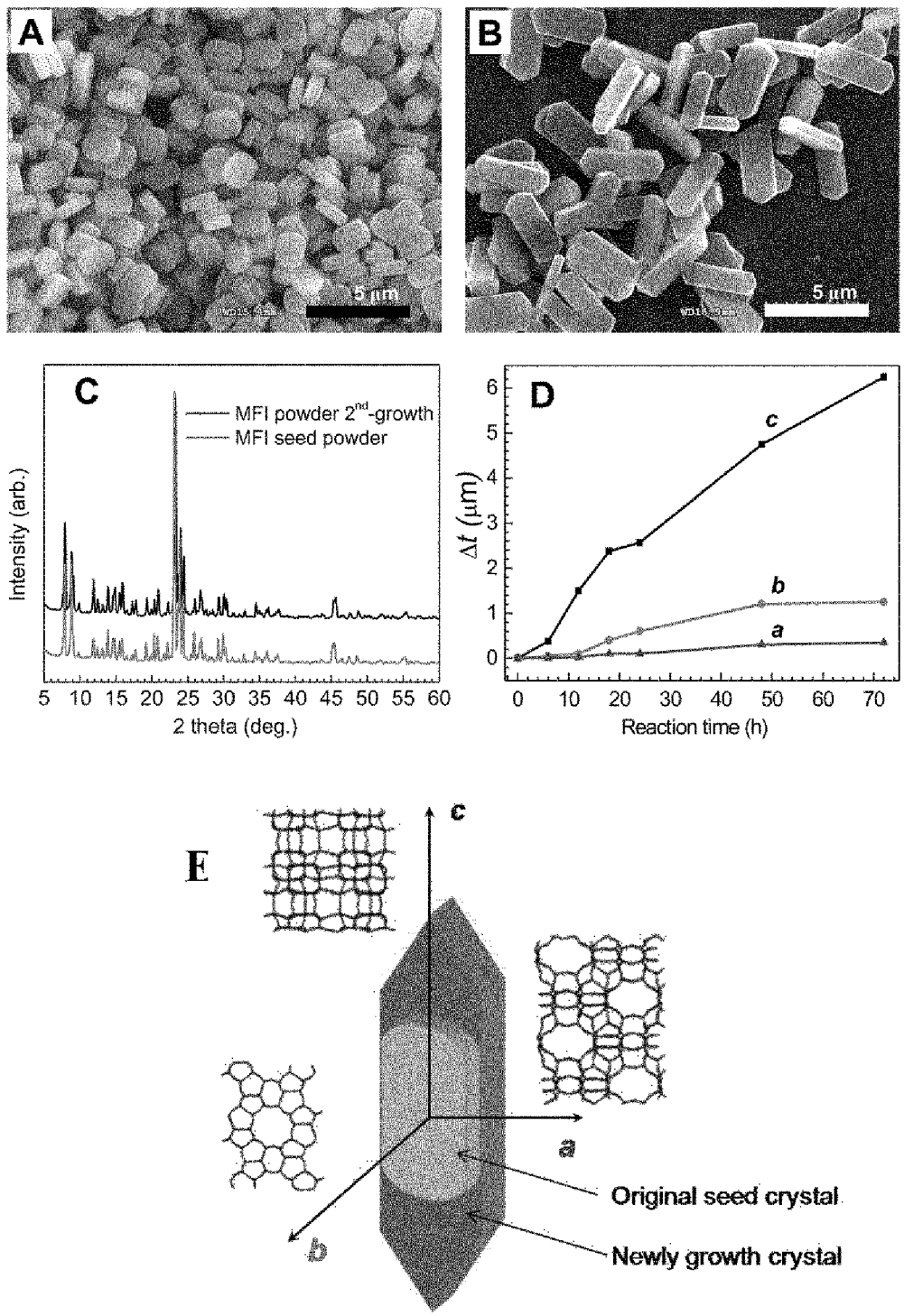
FIG. 17 shows SEM images of leaflet shaped SL seed crystals (A) and the SL crystals grown from the SL seed crystals by secondary growths in Gel-2 (B). (C) represents XRD diffraction patterns of leaflet shaped SL seed crystals and the SL crystals grown from the seed crystals by secondary growth in Gel-2. (D) is plots of the average length increases of the SL crystals vs. reaction time during the secondary growths of leaflet SL crystals in Gel-2. (E) is an illustration of the morphology change of SL seed crystals after secondary growth.

Thus, although the $TEA^+$ ion alone cannot act as a structure-directing agent to initiate self-nucleation of SL crystals in the gel, it can readily engender secondary growth of SL seed crystals when combined with the $F^-$ source. An independent experiment tracking secondary growth of SL seed crystals dispersed in gel-2 showed that the relative growth rates along the a, b, and c directions were a:b:c=1: 3:15 (FIG. 17). Thus, the secondary growth rate along the c direction was still much higher than along the other two directions in gel-2.

Figure 18:
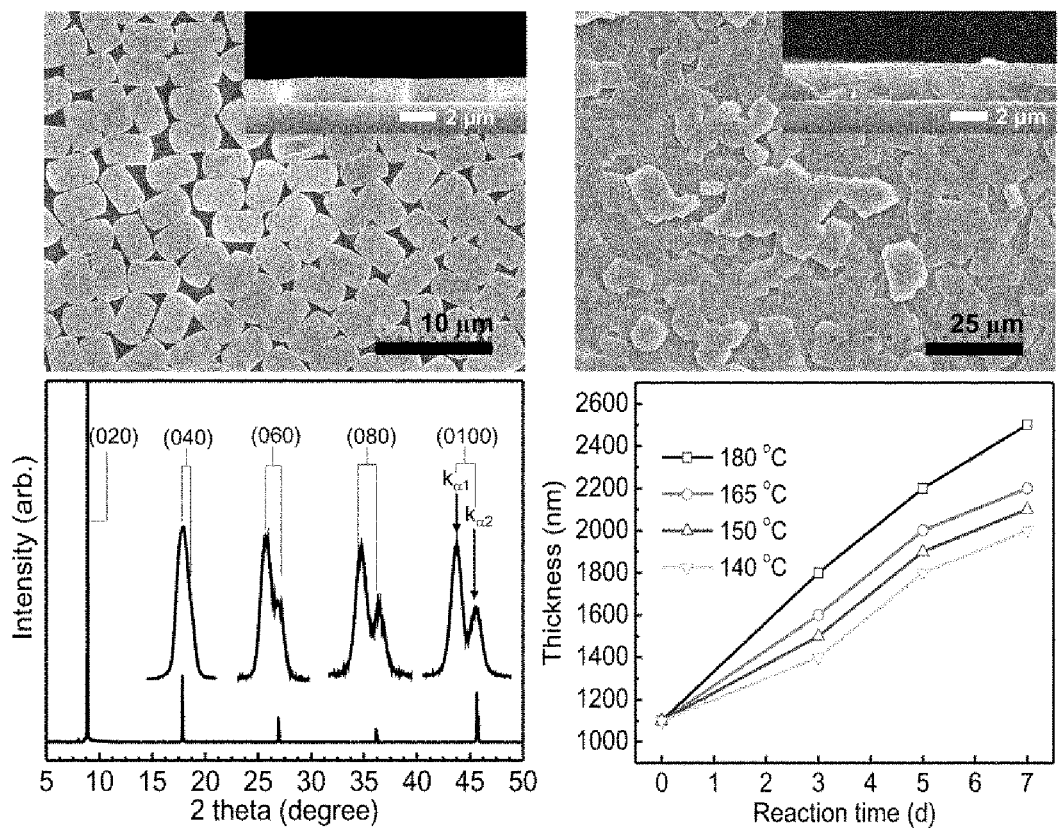
FIG. 18 shows SEM images of a b-$SL_m$/g plate (A) and the continuous b-$SL_f$/g plate prepared by secondary growth of b-$SL_m$/g plates in a TMAOH analog of Gel-2 (B). The reaction was carried out at 165° C. for 7 d. (C) shows the corresponding XRD pattern of a b-$SL_f$/g plate, and (D) is a plot of film thickness vs. reaction time at different reaction temperatures.

The above results suggest that self-crystallization in the gel, subsequent diffusion of the self-formed crystals onto the films, and their ensuing attachment in various orientations are the main causes of randomly oriented SL film growth in TPA and t-TPA gels. In other words, maintaining secondary growth while inhibiting self-crystallization is the key to achieving orientation control in film growth. The use of tetramethylammonium hydroxide (TBAOH) and tetra-n-butylammonium hydroxide (TBAOH) in place of TBAOH in gel-1, gel-2, and gel-3 gives similar results (FIG. 18). It was also found that the gels remaining after secondary growth could be reused at least three more times by immersing fresh a-SL/g, b-SL/g, and a-Si-BEA/g plates into them.

Figure 19:
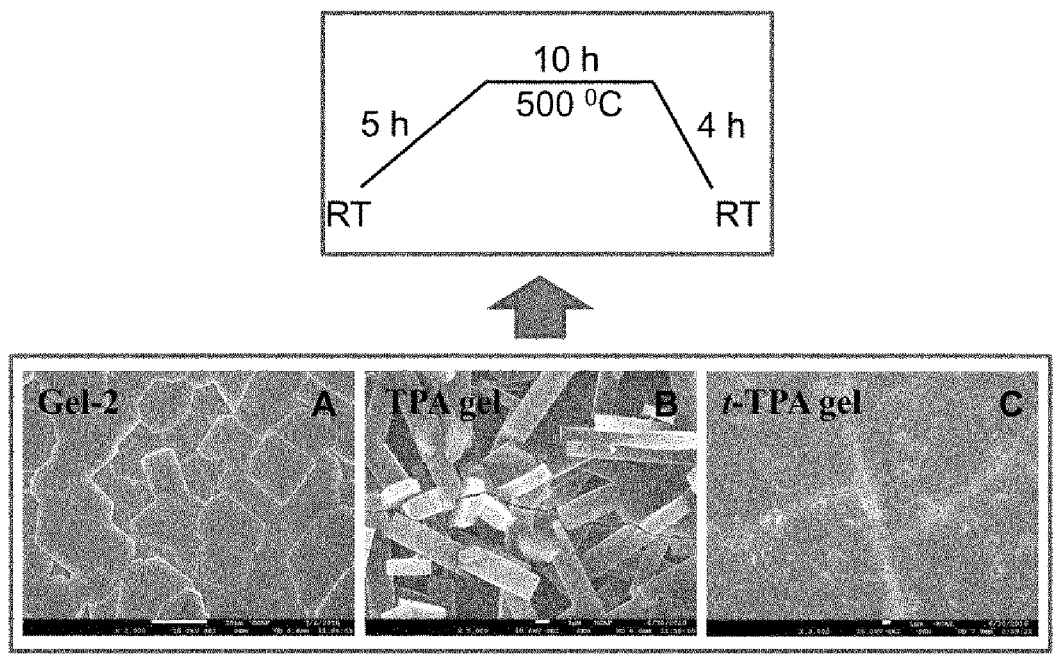
FIG. 19 is a comparison of the crack formation tendencies after calcination at 500° C. (A) is a uniformly b-oriented SL film supported on glass prepared from b-SL$_m$/g plates by secondary growth in Gel-2. (B) is a randomly oriented SL film supported on glass prepared from b-SLm/g plates by secondary growth in a TPA gel. (C) is a randomly oriented SL film supported on glass prepared from b-SL$_m$/g plates by secondary growth in a t-TPA gel. They were calcined simultaneously under the same conditions. The calcination conditions were a 5 h increase of the temperature to 500° C. with the heating rate of 100° C./h (1.67° C./min), calcination at 500° C. for 10 h at this temperature, and cooling with the rate of 125° C./h.

The randomly oriented polycrystalline SL films (FIGS. 3, A and D) readily underwent crack formation upon calcination at 500° C. (FIG. 19) (increasing the temperature at 100° C. hour), caused by the aforementioned complex temperature-dependent anisotropic thermal expansion coefficients of SL crystals. Recently, Tsapatsis et al. demonstrated that a sequence of very rapid (1 min) heating to 700° C., followed by a short (30 s) rest period and very rapid (1 min) cooling to room temperature, leads to stronger binding between the randomly oriented crystals, giving rise to effective suppression of crack formation during calcination.

Figure 20:
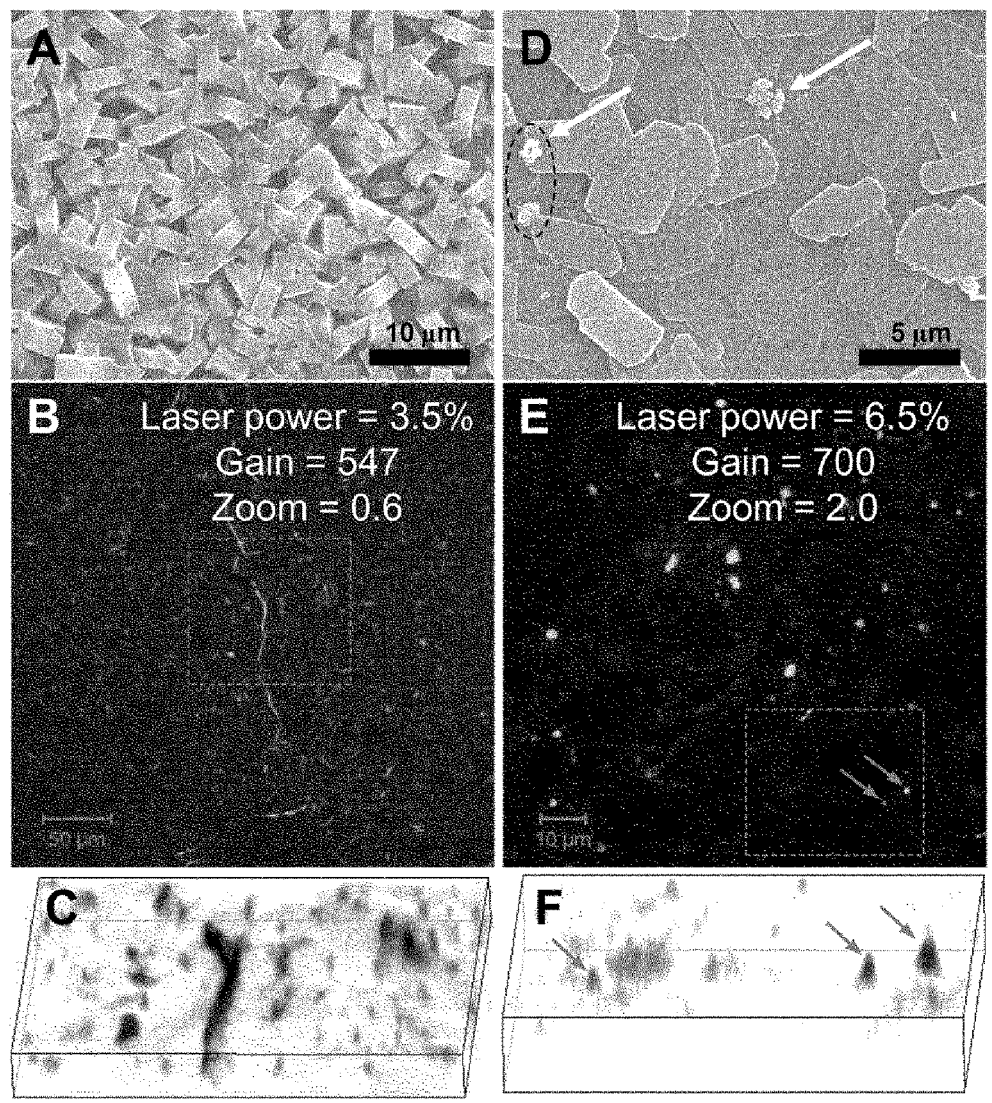
FIG. 20 shows a typical SEM images (A), 2D (B), and 3D (C) LSCM images of a calcined, randomly oriented SL membrane after treatment with fluorescin and typical SEM images (D), 2D (E), and 3D (F) LSCM images of a calcined, uniformly b-oriented SL membrane after treatment with fluorescin.
Figure 21:
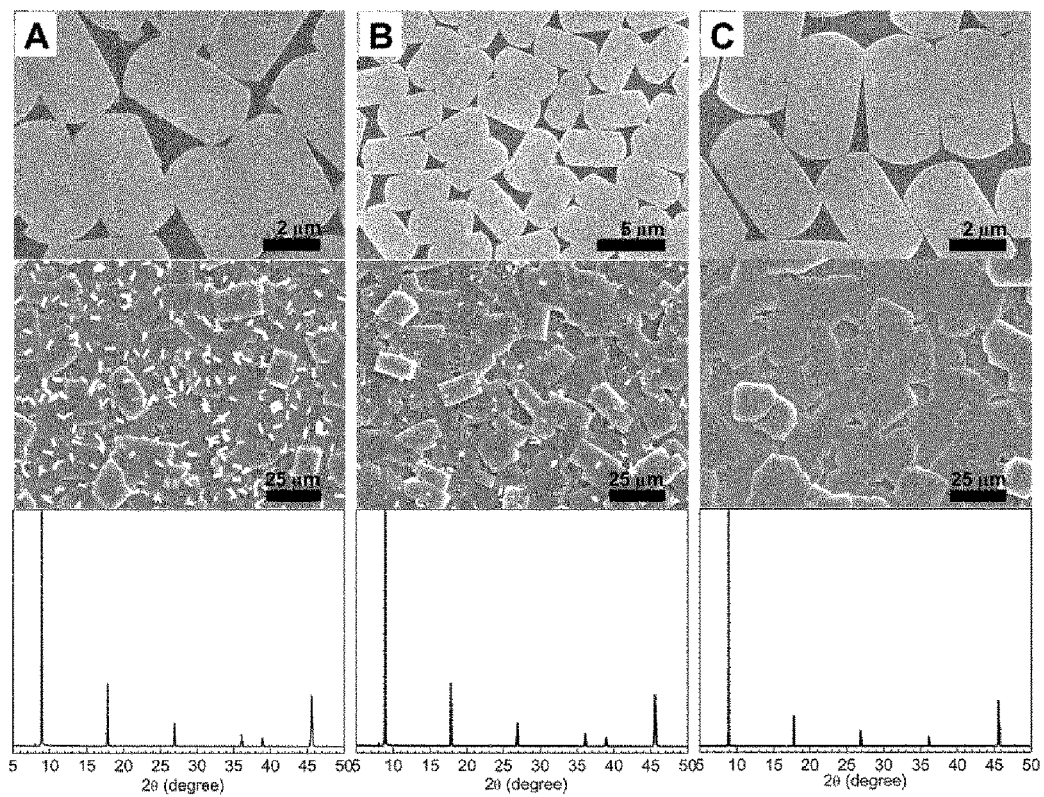
FIG. 21 shows (A) SEM images of a b-SLm/g plate before calcination (top) and after secondary growth in Gel-2 (middle) and the corresponding X-ray diffraction pattern of the film (bottom). (B) shows SEM images of a b-SL$_m$/g plate after calcination (top) and after secondary growth in Gel-2 (middle) and the corresponding X-ray diffraction pattern of the film (bottom). (C) shows SEM images of a b-SL$_m$/g plate after calcination followed by washing with the aqueous 0.2 M NH4F solution (top) and after secondary growth in Gel-2 (middle) and the corresponding X-ray diffraction pattern of the film (bottom).

Uniformly oriented SL and Si-BEA films (FIGS. 2, D, G, and J) do not undergo crack formation during or after 24 hours calcination at 550° C., despite the fact that the lattice is still randomly oriented along the other two axes (a and c). Accordingly, rapid thermal annealing was not necessary to prevent crack formation. In the case of b-oriented SL films, this stability against crack formation was confirmed not only by thorough SEM analyses of the surfaces but also by the observation that 1,3,5-triisopropylbenzene does not diffuse through the calcined b-oriented films supported on porous silica, as described in more detail below. Laser scanning confocal microscopy also confirmed the absence of crack formation during calcination (FIG. 20).

Experimental Example 1: Inclusion of 1-Bromododecane into b-$SL_f$/g/b-$SL_f$ Plates and Analyses of the Included Amounts The inclusion of 1-bromododecane (1-Br—$C_{12}$) into b-$SL_f$/g/b-$SL_f$ plates was carried out by immersing them in neat 1-Br—$C_{12}$ under vacuum. Four b-$SL_f$/g/b-$SL_f$ plates which were calcined calcined and washed with $NH_4F$ (18× 25×1 $mm^3$) were first evacuated at 300° C. for 24 h to dehydrate the films. The dehydrated b-$SL_f$/g/b-$SL_f$ plates were transferred into a Schlenk flask in a glove box charged with dry Ar. 1-Br—$C_{12}$ (5 mL) was added into the Schlenk flask containing dry b-$SL_f$/g/b-$SL_f$ plates and the Ar gas residing inside the Schlenk flask was removed by briefly applying vacuum through the connection of the side arm of the Schlenk tube to a vacuum line connected to the external (outside the glove box) vacuum system. After disconnection from the vacuum line the tightly capped Schlenk tube was inserted into an aluminum block whose temperature was maintained at 50° C. After 3, 5, and 7 days, one (after 3 and 5 days) or two (after 7 days) b-$SL_f$/g/b-$SL_f$ plates were removed from the Schlenk tube and washed the surface-coating 1-Br—$C_{12}$ molecules off the b-$SL_f$/g/b-$SL_f$ plate by flowing 15 mL of n-hexane onto the plate.

The profiles of the relative concentrations of 1-Br—$C_{12}$ in SL channels along the film depth were obtained from a 1-Br—$C_{12}$-incorporating b-$SL_f$/g/b-$SL_f$ plate by energy dispersive X-ray spectroscopic (EDX) analyses of Br and Si. From the two 7-day 1-Br—$C_{12}$-incorporating b-$SL_f$/g/b-$SL_f$ plates 1-Br—$C_{12}$ was also extracted as follows. The 7-day plates were introduced into a plastic beaker containing 3 mL of HF solution (3 M). After gentle shaking for 5 min, the glass plates were removed from the solution and washed them with additional 1 mL of HF solution (3 M) in the plastic beaker. The collected HF solution was cooled to ~0° C. by placing the plastic beaker in an ice bath. An aqueous NaOH solution (3 M, 4 mL) was added drop wise into the cold HF solution. After warming up the aqueous mixture to room temperature 8 mL of n-hexane was added into the aqueous mixture. The mixture was shaken for 1 min and subsequently transferred into a separatory funnel. After standing still for 10 min the upper organic phase was transferred into a 25-mL volumetric flask. The lower aqueous phase was transferred back to the separatory funnel and 8 mL of fresh n-hexane was added into the funnel. After the cycle of shaking, standing still, and separation, the n-hexane layer was transferred into the 25-mL volumetric flask already having ~8 mL of the first cycle extract. The extraction procedure was repeated one more time using 8 mL of n-hexane. Into the 25-mL volumetric flask fresh n-hexane was added until the total volume of the n-hexane solution became 25 mL. The concentration of 1-Br—$C_{12}$ was analyzed from the area of the chromatogram after injecting 5 μL of the solution into a FID-GC equipped with a HPINNO Wax column. A calibration column was independently made for the concentration analysis.

To check the accuracy of our analytical procedure we carried out the following simulated experiment using a known amount of 1-Br—$C_{12}$. In a plastic beaker, 5 mg of freshly calcined SL powder and two slide glass plates with the same size (18×25×1 $mm^3$) were introduced. Into the plastic beaker 3 mL of HF solution (3 M) were added. After gentle shaking until silicalite-1 powder was completely dissolved, these glass substrates were removed from solution and washed with 1 mL of HF solution (3 M). The HF solution was first cooled to ~0° C. by placing the plastic beaker in an ice bath. Into the HF solution 4 mL of NaOH (3 M) was added to neutralize the solution. After warming up, 5 mL of an n-hexane solution of 1-bromododecane (200 mM) was added into the neutral solution. The rest of the extraction and analysis procedure was the same. The obtained recovery was 99.3%.

The key notes used to calculate the incorporated amount of 1-Br—$C_{12}$ in an SL channel are as follows.

Film type: b-$SL_f$/g/b-$SL_f$

Thickness of the film on each side=3 μm

Area of the film in one side=17×25.8 $mm^2$ (slide glass)

Number of channels in one side=3.25×10$^{14}$ channels

Number of channels in two sides=3.25×10$^{14}$×2 channels

Total number of 1-bromododecane molecule=9.4322×10$^{17}$

Exp. Nc=1448.063

Corrected total Nc=1448.063×(extraction factor: 100/99.25)=1,459

Molecular length=18.051 Å

Total length=2.634 μm

Occupied=87.8%

<Experimental Results>

A critical factor for practical application of the SL films is the percentage of straight channels that are open from the top to the bottom of the film. Using the b-oriented SL film (FIG. 2D) as an example, we measured this property by counting the number of 1-bromododecane molecules incorporated into the film after saturation (FIG. 23). The b-oriented SL films were first washed with a 0.2M NH$_4$F solution to remove amorphous layers from the surface and were subsequently dehydrated before immersion in neat 1-bromododecane. After immersion, the air inside the chamber was removed by a brief evacuation at room temperature. After 3, 5, and 7 days of immersion under a reduced pressure, the films were removed from 1-bromododecane and washed with n-hexane.

The depth profiles measured by energy dispersive x-ray spectroscopy showed increasing Br content (atom %) (FIG. 24) with increasing immersion time and depth. The gradual decrease of Br content from the bottom to the surface was probably caused by the hexane surface-washing step, because the SL channels have a higher affinity for n-hexane than for 1-bromododecane. The important point, however, is that 1-bromododecane penetrates to the bottom of the film. This result was further confirmed by our calculation (from the gas chromatographic data) that 1459 molecules of 1-bromododecane were incorporated into a single 3-μm-long SL channel, which corresponds to 87.8% of the theoretical maximum (1662 molecules per channel).

Experimental Example 2: Inclusion of Hemicyanine Dyes (HC-n) into b-SL$_f$/g/b-SL$_f$ Plates and Analyses of the Included Amounts The synthesis of hemicyanine dyes with different alkyl chain lengths (HC-n) and their inclusion into SL films supported on glass plates are well described in our previous report (H. S. Kim et al., J. Am. Chem. Soc. 126, 673 (2004)). For this, each NH4F washed b-SL$_f$/g/b-SL$_f$ plate was divided into 6 pieces with the size of 12×25×1 mm$^3$. The glass supported small b-SL$_f$/g/b-SL$_f$ plates were calcined at 385° C. for 15 h under the oxygen flow and used immediately after calcination.

Into each vial containing a methanol solution of difference HC-n (n=6, 9, 12, 15, 18, 22), three pieces of b-SL$_f$/g/b-SL$_f$ plates were added. These vials were capped and kept at room temperature for 1 week. The films were removed from each solution and washed with fresh methanol, and dried by blowing N$_2$ gas. The analyses of the number of HC-n molecules incorporated in each channel (NC) and the second harmonic (SH) intensity measurements were carried out according to the procedures described in our previous report (H. S. Kim et al., J. Am. Chem. Soc. 126, 673 (2004)).

<Experimental Results>

To explore prospective applications, the inventors first incorporated hemicyanine dyes with varying chain lengths (FIG. 4A) into uniformly b-oriented SL films with a range of thicknesses (0.13, 2.40, 2.60, and 3.00 μm) and measured their 2-NLO activities. To compare with previously reported results, we also incorporated HC-n dyes into b-oriented SL films grown directly on bare glass plates (primary growth films, with a measured thickness of 400 nm).

The profiles of the number of HC-n molecules incorporated into a single SL channel [(N$_C$)$_n$] with respect to the chain length n in HC-n are shown in FIG. 4B for each SL film. In the case of uniformly b-oriented films, (N$_C$)$_n$ increased as the thickness of the film was increased. Furthermore, (N$_C$)$_n$ progressively increased with increasing chain length n until n=15 and progressively decreased with further increasing n. In the case of the primary growth film, however, (N$_C$)$_n$ progressively decreased with increasing n. These results show that the uniformly b-oriented SL films are more hydrophobic than the primary growth film. The (N$_C$)$_n$ value of 16 observed for the 130-nm-thick SL film for the case of HC-15 is a very large increase when compared with the value of ~6 observed for the 400-nm-thick primary growth film. The measured (N$_C$)$_n$ values for the SL film prepared using the t-TPA gel were always smaller than those measured for the 130-nm-thick uniformly b-oriented SL film, despite the fact that the thickness of the former is 10 times thicker (1.3 μm).

The relative second harmonic intensities (rel-I2w) induced by irradiation of SL films (p-polarized I$_{2\omega}$ generated from a p-polarized 1064-nm fundamental laser beam) with respect to that of a 3-mm-thick, Y-cut quartz plate were obtained by the Maker fringe method (FIG. 25), and they are plotted with respect to n for each thickness (FIG. 4C). The plot shows that even 2.4- to 3.0-mm-thick HC-n-incorporating SL films (n=12, 15, 18, and 22) have higher second-order NLO activities than a thousand times thicker (3 mm) quartz, which is often used as the reference material (14). The highest rel-I2w value (174.5%) was obtained from the HC-15-incorporating 3.0-mm-thick SL film (table 2).

TABLE 2

| | Thickness (nm) | | | | | | | | | | |
|---|---|---|---|---|---|---|---|---|---|---|---|
| | 130 | | | 2,400 | | | 2,700 | | | 3,000 | | |
| HC-n | N$_C$ | I$_{2\omega}$ | d$_{33}$ | N$_C$ | I$_{2\omega}$ | d$_{33}$ | N$_C$ | I$_{2\omega}$ | d$_{33}$ | N$_C$ | I$_{2\omega}$ | d$_{33}$ |
| 6 | 10.3 | 2.1 | 6.78 | 10.2 | 0.17 | 0.10 | 11.4 | 0.8 | 0.21 | 12.9 | 1.0 | 0.15 |
| 9 | 13.4 | 8.7 | 13.65 | 16.2 | 20.6 | 1.09 | 31.9 | 20.1 | 1.00 | 33.9 | 19.2 | 0.88 |
| 12 | 16.5 | 51.1 | 32.95 | 42.9 | 104.1 | 2.97 | 50.0 | 116.9 | 2.43 | 60.5 | 113.8 | 2.18 |
| 15 | 15.9 | 58.9 | 35.42 | 50.0 | 144.5 | 2.93 | 66.2 | 158.7 | 2.86 | 71.9 | 174.5 | 2.68 |
| 18 | 12.6 | 41.1 | 29.72 | 40.4 | 126.9 | 2.72 | 51.5 | 134.5 | 2.68 | 53.3 | 170.9 | 2.64 |
| 22 | 9.90 | 43.6 | 30.48 | 38.5 | 108.0 | 2.53 | 43.9 | 119.4 | 2.47 | 47.5 | 159.3 | 2.55 |

Table 2 indicates performances of the glass places coated with HC-n-incorporating uniformly b-oriented SL films on both sides. SL film thickness is in nm. Nc represents a number of HC-n dyes in each channel, I$_{2\omega}$ does relative second harmonic intensity of the HC-n-including SL film with respect to that of a 3-mm y-cut quartz as the reference, and $d_{33}$ does a corresponding polarizability tensor component.

This value also corresponds to a 21-fold increase with respect to the highest value previously observed using HC-n-incorporating primary growth SL films (8%). The measured values observed for the SL film prepared by t-TPA gel were always smaller than 7.1%.

The calculated $d_{33}$ values (a tensor component of the quadratic nonlinear susceptibility of a 2-NLO material) for HC-n-incorporating SL films are tabulated in table 2. In the case of HC-15, the $d_{33}$ values are between 2.68 (3-μm film) and 35.42 pm/V (0.13-μm film). Corresponding values of commercial 2-NLO materials range from 0.16 to 13.7 pm/V (table 3). Thus, uniformly b-oriented HC-15-incorporating SL films have potential for development into commercially viable 2-NLO materials. In contrast, the $d_{33}$ value of the SL film prepared from t-TPA gel was 1.21 pm/V, indicating that it is less suitable for commercial applications (table 4).

TABLE 3

| Materials | dnm (pm/V) |
| --- | --- |
| Quartz | 0.364 ($d_{11}$) |
| LiNbO$_3$ | 2.76 ($d_{22}$) |
| BBO | 2.22 ($d_{22}$) |
|  | 0.16 ($d_{31}$) |
| KTP | 6.5 ($d_{31}$) |
|  | 5.0 ($d_{32}$) |
|  | 13.7 ($d_{33}$) |
| COANP | 10.0 ($d_{33}$) |

COANP in table 3 is 2-cyclooctylamino-5-nitropyridine. Table 3 shows values of tensor components for the quadratic nonlinear susceptibility of 2-NLO materials.

TABLE 4

|  | From TPA gel (400 nm) | | | From t-TPA gel (1300 nm) | | |
| --- | --- | --- | --- | --- | --- | --- |
| HC-n | $N_C$ | $I_{2\omega}$ | $d_{33}$ | $N_C$ | $I_{2\omega}$ | $d_{33}$ |
| 6 | 23.1 | 0.1 | 0.50 | 5.6 | 0.23 | 0.22 |
| 9 | 15.4 | 1.6 | 2.25 | 7.6 | 0.23 | 0.22 |
| 12 | 8.20 | 3.8 | 3.59 | 8.0 | 2.44 | 0.69 |
| 15 | 5.70 | 7.0 | 4.99 | 12.6 | 7.08 | 1.21 |
| 18 | 3.50 | 7.9 | 5.30 | 8.8 | 2.83 | 0.76 |
| 22 | 0.90 | 0.9 | 1.71 | 8.0 | 2.72 | 0.75 |

Table 4 indicates performances of the glass plates coated by secondary growth of b-SL$_m$/g plates in TPA and t-TPA gels on both sides.

Furthermore, the 2-μm-thick uniformly b-oriented films showed transparencies (70 to 84% in the 380- to 1100-nm region) comparable to those of plain glass (~85%) (FIGS. 26 and 27). The corresponding values observed from the random SL films were 20 to 60% when prepared from the t-TPA gel and below 12% when prepared from the TPA gel.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method for preparing a thin film or a thick film, the method comprising:
   (1) aligning non-spherical silicalite-1 seed crystals on at least one surface of a substrate such that one or more or all of a-axes, b-axes and c-axes of the seed crystals are oriented according to a predetermined rule;
   (2) removing an amorphous silica layer formed on the surface of the seed crystals; and
   (3) exposing the aligned seed crystals to the synthetic gel for crystal growth, which induces only secondary growth from a surface of silicalite-1 (SL) seed crystals and does not induce crystal nucleation in the synthetic gel or on the surface of the seed crystals, comprising fumed silica, tetraethylammonium hydroxide (TEAOH), [(NH4)2SiF6], KOH and H2O, and forming and growing the film from the seed crystals by a secondary growth method.

2. The method of claim 1, wherein a secondary growth from the seed crystal surface using the synthetic gel enables the seed crystals to be connected to one another two-dimensionally while growing vertically to form a three-dimensional structure, thereby forming the film.

3. The method of claim 1, wherein the film, formed in an area in which orientations of at least one axis of seed crystals adjacent to each other are uniform, have: (a) channels that are continuously connected to one another and extend in an axial direction parallel to the substrate surface; (b) channels that are continuously connected to one another and extend in an axial direction perpendicular or inclined with respect to the substrate surface; or (c) both the channels of (a) and the channels of (b).

4. The method of claim 1, wherein the a-axis, b-axis or c-axis of the seed crystals is oriented normal to the substrate surface in step (1).

5. The method of claim 1, wherein step (1) comprises placing the seed crystals on the substrate, and then aligning the orientation of the a-axis, b-axis or c-axis of the seed crystals by physical pressure.

6. The method of claim 5, wherein the physical pressure is applied by rubbing or pressing against the substrate.

7. A method for preparing a thin film or a thick film, the method comprising:
   (1) aligning non-spherical or zeolite beta seed crystals on at least one surface of a substrate such that one or more or all of a-axes, b-axes and c-axes of the seed crystals are oriented according to a predetermined rule;
   (2) removing an amorphous silica layer formed on the surface of the seed crystals; and
   (3) exposing the aligned seed crystals to the synthetic gel for crystal growth, which induces only secondary growth from a surface of zeolite beta (BEA) seed crystals and does not induce crystal nucleation in the synthetic gel or on the surface of the seed crystals, comprising tetraethylorthosilicate (TEOS), tetraethylammonium hydroxide (TEAOH), hydrogen fluoride and H2O, and forming and growing the film from the seed crystals by a secondary growth method.

8. The method of claim 1, wherein a ratio of fumed silica:TEAOH:[(NH$_4$)$_2$SiF$_6$]:KOH:H$_2$O in the synthetic gel for crystal growth is 4.00:1.92:0.36:0.40:n$_1$ (molar ratio), where n$_1$ ranges from 30 to 80.

9. The method of claim 1, wherein the synthetic gel for crystal growth is capable of inducing secondary growth such that a-axes of silicalite-1 (SL) are uniformly oriented.

10. The method of claim 7, wherein a ratio of TEOS:TEAOH:hydrogen fluoride:$H_2O$ in the synthetic gel is 4.00:2.20:2.20:$n_3$ (molar ratio), where $n_3$ ranges from 30 to 40.

11. The method of claim 7, wherein the synthetic gel is capable of inducing secondary growth such that a-axes or b-axes of zeolite beta (BEA) are uniformly aligned.

* * * * *